(12) United States Patent
Tane et al.

(10) Patent No.: US 7,874,689 B2
(45) Date of Patent: Jan. 25, 2011

(54) DISPLAY DEVICE

(75) Inventors: Seigo Tane, Kariya (JP); Satoshi Sugiura, Handa (JP); Akira Kamiya, Inabe-gun (JP)

(73) Assignee: Denso Corporation, Kariya (JP)

( * ) Notice: Subject to any disclaimer, the term of this patent is extended or adjusted under 35 U.S.C. 154(b) by 558 days.

(21) Appl. No.: 11/905,623

(22) Filed: Oct. 2, 2007

(65) Prior Publication Data

US 2008/0123322 A1     May 29, 2008

(30) Foreign Application Priority Data

| Oct. 3, 2006 | (JP) | ............................. 2006-272238 |
| Oct. 3, 2006 | (JP) | ............................. 2006-272239 |
| Oct. 20, 2006 | (JP) | ............................. 2006-286745 |
| Sep. 5, 2007 | (JP) | ............................. 2007-230548 |

(51) Int. Cl.
  *G01D 11/28*     (2006.01)
(52) U.S. Cl. .............................. 362/23; 362/29; 362/30; 362/600; 362/604
(58) Field of Classification Search ....... 362/97.1–97.4, 362/600, 604, 605, 609, 23, 29, 30, 471, 362/482, 489
See application file for complete search history.

(56) References Cited

U.S. PATENT DOCUMENTS

| 3,241,256 | A | * | 3/1966 | Viret ............................ 40/546 |
| 5,390,436 | A | * | 2/1995 | Ashall .......................... 40/546 |
| 5,741,058 | A | | 4/1998 | Suzuki et al. |
| 5,949,346 | A | | 9/1999 | Suzuki et al. |
| 6,120,159 | A | * | 9/2000 | Inoguchi et al. ................ 362/29 |
| 6,382,127 | B2 | | 5/2002 | Wehner |
| 6,817,310 | B2 | * | 11/2004 | Sugiyama et al. ........... 116/62.4 |
| 6,904,866 | B2 | * | 6/2005 | Furuya ........................ 116/286 |
| 2006/0158320 | A1 | | 7/2006 | Shibata |

FOREIGN PATENT DOCUMENTS

| JP | 08-268114 | 10/1996 |
| JP | 9-43001 | 2/1997 |
| JP | 11-005457 | 1/1999 |
| JP | 11-271100 | 10/1999 |
| JP | A-2003-207372 | 7/2003 |
| JP | 2004-157434 | 6/2004 |
| JP | 2004-184221 | 7/2004 |
| JP | 2004-301533 | 10/2004 |
| JP | D1251592 | 9/2005 |
| JP | 2006-021574 | 1/2006 |
| JP | D1265592 | 3/2006 |
| JP | 2006-201038 | 8/2006 |
| JP | 2006-292485 | 10/2006 |
| JP | D1293659 | 2/2007 |
| JP | 2007-052031 | 3/2007 |

* cited by examiner

*Primary Examiner*—Sandra L O Shea
*Assistant Examiner*—Danielle Allen
(74) *Attorney, Agent, or Firm*—Nixon & Vanderhye PC

(57) ABSTRACT

A display device includes: a display element for showing information as a screen image; and an ornamental member disposed on a display surface of the display element and having a shape corresponding to the screen image. The ornamental member includes a light transparent element and a light nontransparent element. The screen image includes a designed image on a position of the display surface corresponding to the light transparent element. The display element outputs a screen image light from the display surface. The screen image light corresponding to the designed image passes through the light transparent element so that the screen image light is outputted from the ornamental member to the display side.

24 Claims, 14 Drawing Sheets

DISPLAY DEVICE

CROSS REFERENCE TO RELATED APPLICATIONS

This application is based on Japanese Patent Applications No. 2006-272239 filed on Oct. 3, 2006, No. 2006-272238 filed on Oct. 3, 2006, No. 2006-286745 filed on Oct. 20, 2006, and No. 2007-230548 filed on Sep. 5, 2007, the disclosures of which are incorporated herein by reference.

FIELD OF THE INVENTION

The present invention relates to a display device.

BACKGROUND OF THE INVENTION

As a conventional display device, a structure in which a decorative ring formed of light transmissive construction material is provided on the front surface side of a liquid crystal panel is known. The liquid crystal panel is transmission-illuminated using a backlight. The decorative ring is transmission-illuminated with light from the liquid crystal panel. The display panel is disclosed in, for example, JP-A-2006-201038 corresponding to US Patent Application Publication No. 2006/0158320.

However, in the above conventional display device, the decorative ring as a whole has translucency, accordingly, the appearance of the display device lacks variety and is monotonous.

Thus, it is required for the display device to have novel appearance with a structure in which a decorative member on the front surface side. The decorative member is light-emission displayed.

Further, in this display device, the decorative ring is provided on the front surface side of the liquid crystal panel such that the display device looks solid.

In this conventional display device, the decorative ring is provided with a display stylish part associated with an image formed on the liquid crystal panel.

However, in the above conventional vehicle display device, the decorative ring is illuminated with only light from the liquid crystal panel. That is, as the incident direction of the light illuminating the decorative ring is limited to a fixed direction. Accordingly, the appearance of the decorative ring lacks variety and is monotonous.

Thus, it is required for the display device to have novel appearance with emphasis on solid impression of the front surface side of the display device.

Further, in the above conventional display device, the decorative ring as a whole has translucency, accordingly, the appearance of the display device lacks variety and is monotonous. Furthermore, a display area in the display device is almost determined based on the size of the display device. When a liquid crystal display device is used as a display device, to enlarge the display area, it is necessary to use a larger liquid crystal display device, which increases the costs.

Thus, it is required for the display device to have novel appearance while suppress increase in costs.

SUMMARY OF THE INVENTION

In view of the above-described problem, it is an object of the present disclosure to provide a display device.

According to a first aspect of the present disclosure, a display device includes: a display element for showing information as a screen image, wherein the display element has a display side and a backside, and wherein the display element includes a display surface, which is disposed on the display side; and an ornamental member disposed on the display surface of the display element. The ornamental member has a shape, which corresponds to a shape of the screen image. The ornamental member includes a light transparent element and a light nontransparent element, which are assembled with each other. The screen image includes a designed image, which is disposed on a position of the display surface corresponding to the light transparent element. The display element outputs a screen image light from the display surface. The screen image light corresponding to the designed image passes through the light transparent element so that the screen image light is outputted from the ornamental member to the display side.

In the above device, the display design on the display element is not directly viewed but viewed through the light transparent element of the ornamental member. Thus, the display design appears to protrude from the surface of the display element. Further, since the light nontransparent element is adjacent to the light transparent element, the light nontransparent element emphasizes existence of the light transparent element. The visual quality of the display element is improved such that three-dimensional appearance is emphasized and novel design is provided. Thus, the device has the novel design and the high visual quality without increasing the dimensions of the device.

According to a second aspect of the present disclosure, a display device includes: a display element for showing information as a screen image, wherein the display element has a display side and a backside, wherein the display element includes a display surface, which is disposed on the display side, and wherein the screen image includes a first display design; an ornamental member disposed on the display surface of the display element; a first reflection element disposed on the ornamental member, wherein the first reflection element reflects a screen image light toward a direction in parallel to the display surface, the screen image light corresponding to the first display design of the screen image and outputted from the display element; and a second reflection member including a second reflection surface. The second reflection surface reflects a reflected screen image light from the first reflection element toward the display side. The second reflection surface contacts an outer periphery of the screen image, and the first display design provides a reflected virtual image, which is imaged on the second reflection surface by reflecting the reflected screen image light with the second reflection surface.

In the above device, since the ornamental member and the second reflection member are arranged on the display side from the surface of the display element, the visual quality of the display element is improved such that three-dimensional appearance is emphasized. Further, the reflected virtual image of the first display design is viewed on the outside of the outer periphery of the screen image. Thus, without replacing the display element to a larger one, the display region of the screen image appears to be larger. Thus, the device has the novel design and the high visual quality without increasing the dimensions of the device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Hereinbelow, a display device according to the present invention will be described in an example in which the display device is applied to a combination meter 1 mounted in a vehicle, based on the drawings.

Figure 1:
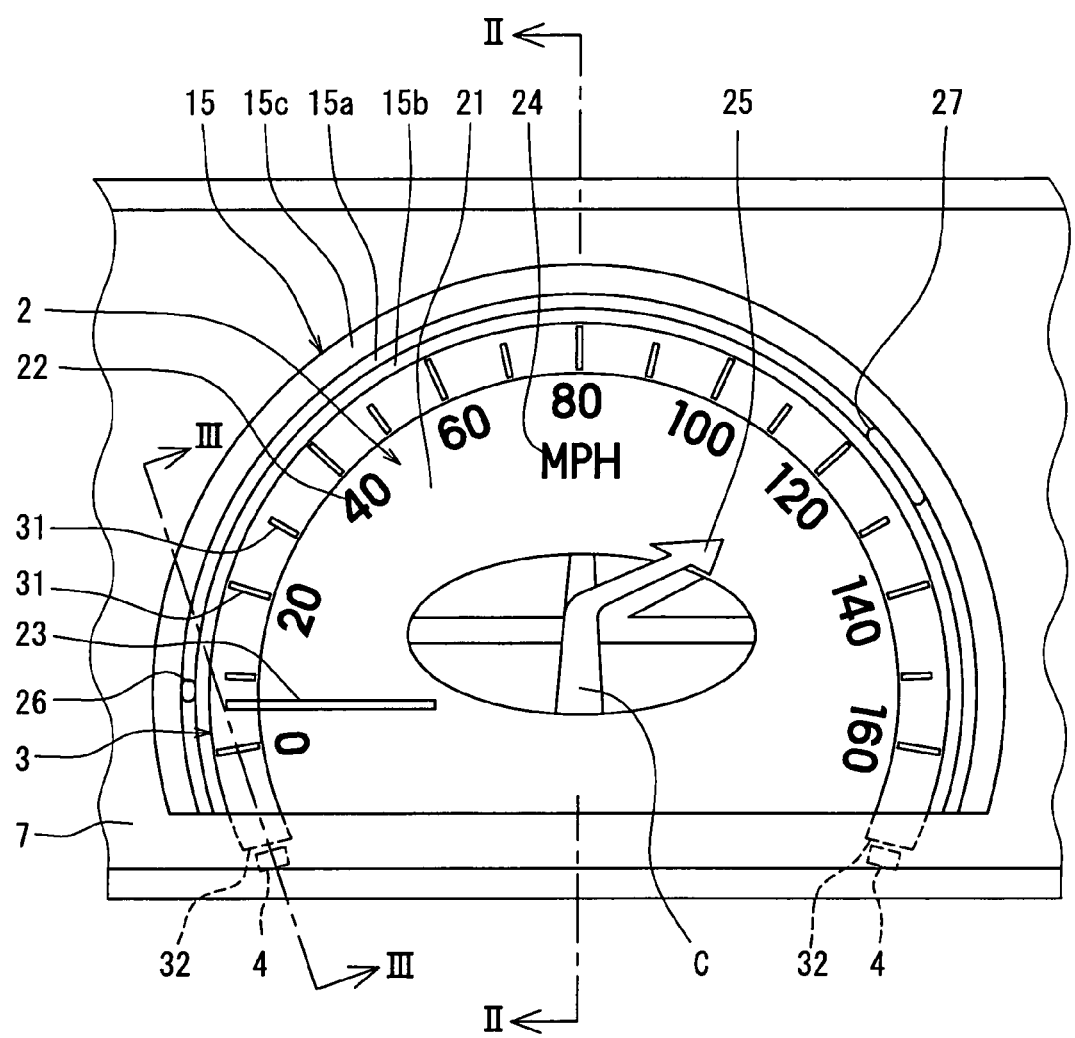
FIG. 1 is a partial front view of a combination meter as a display device according to a first embodiment of the present invention.

The combination meter 1 is provided in an instrument panel in a front of a driver's seat in a vehicle compartment. Information necessary for vehicle driving and information on operation statuses of the respective parts of the vehicle are displayed, as images, on an image screen 21 of a liquid crystal panel 2 as a display element, for visual recognition by the driver. In the combination meter 1, as shown in FIG. 1, a speedometer S to indicate a running speed of the vehicle and a navigation guide N to indicate a course to a destination are formed as images on the image screen 21 of the liquid crystal panel 2.

Figure 2:
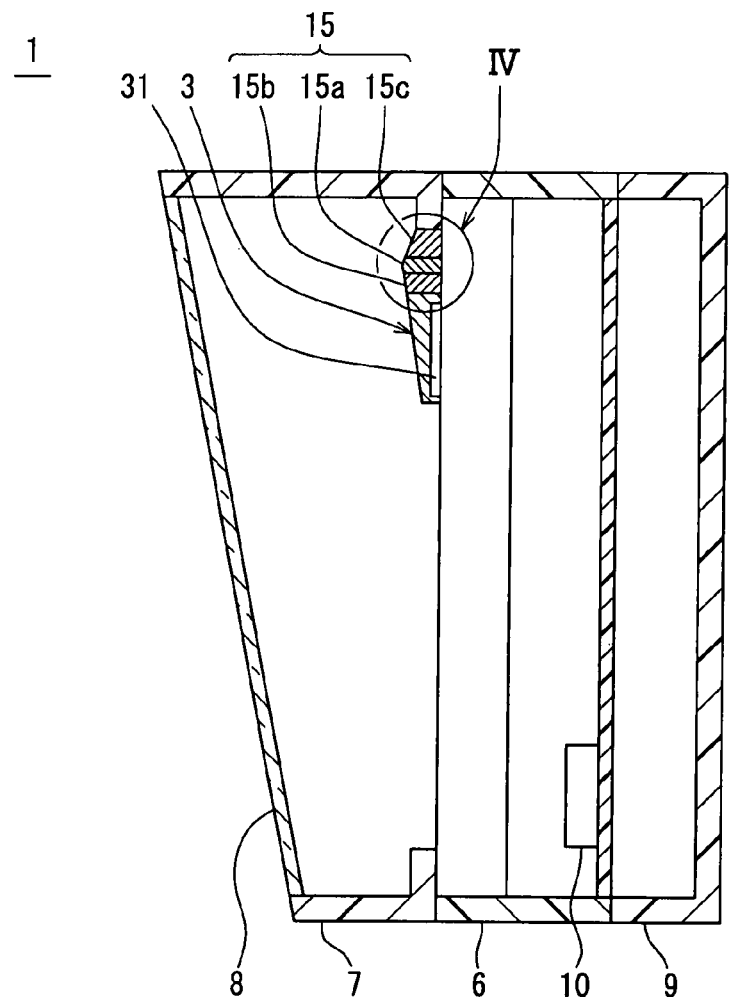
FIG. 2 is a cross-sectional view along a line II-II in FIG. 1.

In the combination meter 1, a liquid crystal display unit is used as a display unit. More particularly, a TFT (Thin Film Transistor) type dot matrix type display unit is used. As shown in FIG. 2, the liquid crystal panel 2 is transmission-illuminated with a backlight (not shown) provided in the rear of the liquid crystal panel 2 (right side in FIG. 2), thereby light-emission displayed. In the liquid crystal panel 2, the above-described speedometer S and the navigation guide N are formed as images on the image screen 21.

First, the structure of the speedometer S will be described.

The speedometer S is formed as an analog meter. That is, as shown in FIG. 1, numeric characters 22, a pointer 23 as an indicating figure, and characters 24 are formed as images on the image screen 21. Further, scale marks 31 as display stylish parts are formed in a scale ring 3 as a stylish member to be described later, provided on the liquid crystal panel 2. The pointer 23 is displayed while rotated about a virtual center C on the image screen 21 in correspondence with the running speed of the vehicle. The running speed is displayed by pointing of the numeric character 22 and the scale marks 31 with the pointer 23 as an indicating figure. As shown in FIG. 1, the numeric characters 22 are arranged radially along a circular arc about the virtual center C.

On the front surface side of the liquid crystal panel 2 (left side in FIG. 2), the scale ring 3 is provided on the liquid crystal panel 2. The scale ring 3 is formed of translucent material such as transparent and colorless polycarbonate resin or acryl resin. The scale ring 3 is formed in a shape associated with the shape of the speedometer S. That is, as shown in FIG. 1, the scale ring 3 is formed in a cutaway annulus ring shape, and is provided coaxially with the virtual center C as a rotational center of the pointer 23, on the liquid crystal panel 2. As shown in FIG. 1, the scale ring 3 is provided in a position away from a distal end of the pointer 23 formed on the image screen 21 of the liquid crystal panel 2, i.e., on the outer peripheral side of the pointer 23, on the liquid crystal panel 2. The scale ring 3 has the scale marks 31 as display stylish parts of the speedometer S.

Figure 3:
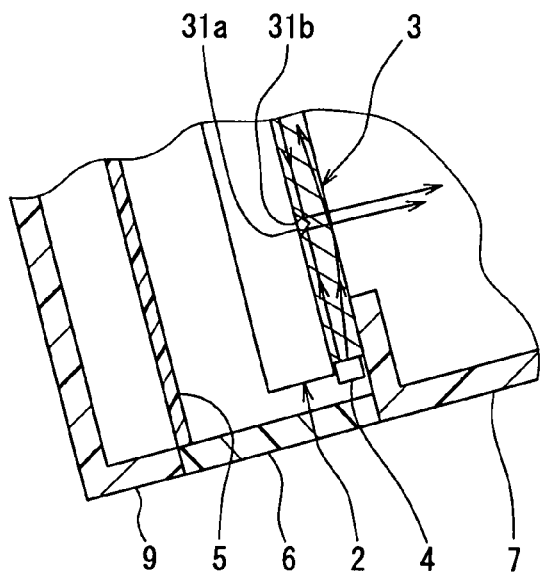
FIG. 3 is a cross-sectional view along a line III-III in FIG. 1.

The scale marks 31 are formed by providing thin and long concavities on the rear side (the right side in FIG. 2) of the scale ring 3. As shown in FIG. 3, the concavities as the scale marks 31 have a V-shaped cross-section formed with two slopes 31a and 31b. The scale marks 31 are provided in the scale ring 3 radially about the virtual center C. Light emitting diodes 4 as light sources respectively for emitting light inside the scale ring 3 are provided on both end surfaces 32 of the scale ring 3. As shown in FIG. 3, the light from the light emitting diodes 4, proceeding in the scale ring 3 is reflected with the slopes 31a and 31b, to the front surface side of the combination meter 1, i.e., the driver side, from the scale ring 3. This reflected light is visually recognized as the scale marks 31. The light from the light emitting diodes 4 entered from the respective end surfaces 32 into the scale ring 3 proceed in the scale ring 3, while repeatedly reflected with respective surfaces of the scale ring 3, and respectively arrive to a position around the opposite end surface 32. Before the light from the light emitting diodes 4 arrive at the position around the respectively opposite end surfaces 32, the light are reflected with the slopes 31a and 31b between the end surfaces 32. Thus all the scale marks 31 provided in the scale ring 3 are light-emission displayed with approximately the same luminosity.

Next, the structure of the navigation guide N will be described.

As shown in FIG. 1, the navigation guide N indicates a course to a destination with a course arrow 25 which is an indicating figure formed as an image on the liquid crystal panel 2. When the vehicle approaches an intersection, a pattern diagram of the intersection is displayed as shown in FIG. 1, and a direction in which the vehicle is to travel is superpose-displayed on the pattern diagram of the intersection. In FIG. 1, the intersection is a five-forked road, and the direction in which the vehicle is to travel is about a rightward 45 degree angle direction. These indications are made based on a display signal from a navigation system device 14 mounted in the vehicle. The navigation system device 14 is a well-known device which calculates a vehicle position based on a position signal from a satellite and a signal from a built-in inertial navigation unit. When the vehicle is to travel a road on which the vehicle is currently running, only the course arrow 25 is displayed on the navigation guide N. The course arrow 25 points up in FIG. 1.

Next, a decorative ring 15 as a decorative member (i.e., ornamental member) provided on the front surface side of the liquid crystal panel 2 will be described.

As shown in FIG. 1, the decorative ring 15 as a whole is formed in a circular arc coaxial with the scale ring 3. As in the case of the scale ring 3, the decorative ring 15 is attached in close contact with the surface of the liquid crystal panel 2, as shown in FIG. 2. The decorative ring 15 has a trim ring 15b as an opaque member (i.e., light nontransparent element), a transparent ring 15a as a translucent member (i.e., light transparent element), and a trim ring 15c as an opaque member (i.e., light nontransparent element), sequentially arranged from the scale ring 3 side toward the outer peripheral side, in close contact with each other.

The transparent ring 15a is formed of transparent and colorless acryl resin, polycarbonate resin or the like. The trim rings 15b and 15c are formed of chrome plated ABS resin or the like so as to have a light shielding property.

Figure 5:
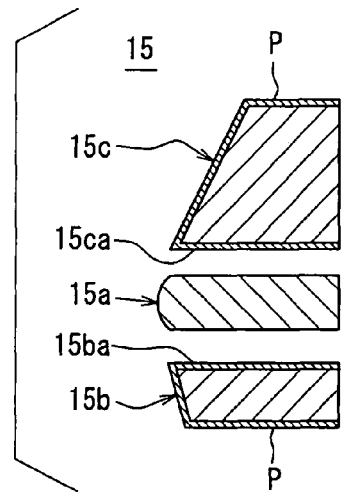
FIG. 5 is a schematic cross-sectional view explaining the structure of a decorative ring.

As shown in FIG. 5, all the surfaces of the trim rings 15b and 15c are coated with a chrome plate layer P except surfaces opposite to the liquid crystal panel 2. Accordingly, in the trim rings 15b and 15c, wall surfaces 15ba and 15ca opposite to the transparent ring 15a are also coated with the chrome plate layer P. The chrome plate layer P applied to the wall surfaces 15ba and 15ca functions as a light reflecting layer with high reflectance. The transparent ring 15a, the trim ring 15b and the trim ring 15c are fixed, with the entire areas of their respective surfaces in close contact, with each other.

Figure 4:
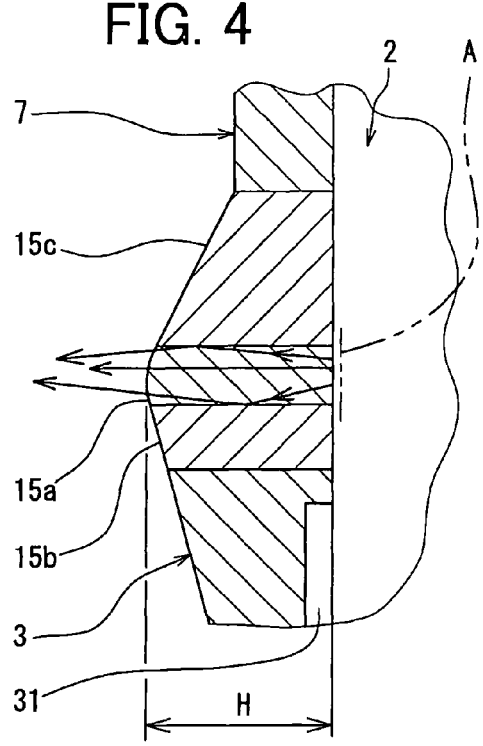
FIG. 4 is an enlarged view of a part IV in FIG. 2.

As shown in FIG. 4, in the screen image 21 of the liquid crystal panel 2, an illumination image A as a stylish image member (i.e., designed image) is formed in a part overlapped with the transparent ring 15a or a part slightly wider than the part overlapped with the transparent ring 15a. The illumination image A functions as a light source to light-emission display the transparent ring 15a of the decorative ring 15. The transparent ring 15a is transmission-illuminated with light emitted from the illumination image A, thereby light-emission displayed. Thus the decorative ring 15 is visually recognized, with metallic lustrous trim rings 15b and 15c on both sides of the transparent ring 15a light-emission displayed in a circular arc shape, like a bordering.

The light emitted from the illumination image A enters the transparent ring 15a, and as shown in 4, a part of the light proceeds, while repeatedly reflected with wall surfaces of the transparent ring 15a, to the outside from the transparent ring 15a. The transparent ring 15a, the trim ring 15b and the trim ring 15c are fixed, with the entire areas of their respective surfaces in close contact, with each other. In other words, the transparent ring 15a, and the trim ring 15b and the trim ring 15c provided on both sides of the transparent ring 15a, are fixed, with the entire areas of their opposite surfaces in close contact, with each other. Accordingly, the wall surface of the transparent ring 15a opposite to the trim ring 15b and the wall surface of the transparent ring 15a opposite to the trim ring 15c act as mirror surfaces to the light proceeding in the transparent ring 15a. Accordingly, the light entered in the transparent ring 15a from the illumination image A is guided, while reflected with the respective wall surfaces with high reflectance, to the front surface of the transparent ring 15a in almost non-attenuated state. Even in an arrangement where the length of projection of the transparent ring 15a from the liquid crystal panel 2 ("H" in FIG. 4) is increased to emphasize solid impression of the decorative ring 15, as the light entered in the transparent ring 15a from the illumination image A is guided to the front surface of the transparent ring 15a and to the outside with high efficiency, the luminescence intensity of the transparent ring 15a can be increased. Further, the wall surfaces 15ba and 15ca of the trim rings 15b and 15c as the wall surfaces opposite to the transparent ring 15a are coated with the chrome plate layer P as a light reflecting layer. Accordingly, even if the light is leaked from the transparent ring 15a, the light is reflected with the chrome plate layer P on the wall surfaces 15ba and 15ca, and again proceeds in the transparent ring 15a. Accordingly, as the light entered in the transparent ring 15a from the illumination image A is guided to the front surface of the transparent ring 15a and to the outside with high efficiency, the luminescence intensity of the transparent ring 15a can be increased.

As shown in FIG. 1, in the illumination image A as a stylish image member, a pointing indicator 26 in a spot shape is formed as an image, as a high luminosity member with luminosity higher than that of its surrounding area, in a position extended from the pointer 23. The pointing indicator 26 rotates, always integrally with the pointer 23, about the virtual center C. The pointing indicator 26 viewed from the driver side is visually recognized as a bright luminescent spot in a position extended from the pointer 23 on the transparent ring 15a. When the pointer 23 rotates in correspondence with a change of the running speed, the pointing indicator 26 in synchronization with the rotation of the pointer 23 also rotates, always in a position extended from the pointer 23. In this arrangement, the visibility of the speedometer S can be improved with novel appearance of the speedometer S. As shown in FIG. 1, the decorative ring 15, more particularly, the trim ring 15b on the inner peripheral side of the decorative ring 15, is away from the distal end of the pointer 23. The pointer 23 and the pointing indicator 26 are visually recognized completely separately as two displays.

Further, as shown in FIG. 1, in the illumination image A as a stylish image member, a course arrow indicator 27 in a line shape is formed as an image, as a high luminosity member with luminosity higher than that of its surrounding area, in a position extended from the course arrow 25. When the direction indicated with the course arrow 25 is changed, the course arrow indicator 27 rotates in correspondence with the change of the direction, about the virtual center C, always in a position extended from the course arrow 25. The course arrow indicator 27 viewed from the driver side is visually recognized as a bright luminescent line in a position extended from the course arrow 25 on the transparent ring 15a. When the course arrow 25 rotates in correspondence with a change of the indicated course direction, the course arrow indicator 27 in synchronization with the rotation of the course arrow 25 also rotates, always in a position extended from the course arrow 25. In this arrangement, the visibility of the navigation guide N can be improved with novel appearance of the navigation guide N. As shown in FIG. 1, the decorative ring 15, more particularly, the trim ring 15b on the inner peripheral side of the decorative ring 15, is away from the distal end of the course arrow 25. The course arrow 25 and the course arrow indicator 27 are visually recognized completely separately as two displays.

As shown in FIG. 3, a printed circuit board 5 is provided on the rear side of the liquid crystal panel 2. The printed circuit board 5, formed with a glass epoxy substrate and the like, forms an electric circuit of the combination meter 1. The above-described liquid crystal panel 2 and the light emitting diodes 4 are electrically connected to the printed circuit board 5. The connection between the liquid crystal panel 2 and the printed circuit board 5 is made using e.g. a FPC (Flexible Printed Circuit) (not shown). A controller 10 to control a display operation of the liquid crystal panel 2 is mounted on the printed circuit board 5. The controller 10 calculates the running speed of the vehicle based on an external electric signal, i.e., a detection signal from a vehicle speed sensor 13, and drives the liquid crystal panel 2 to display the calculated speed. Further, the controller 10 drives the liquid crystal panel 2 to display the course array 25 on the navigation guide N based on a position signal from the navigation system device 14. The controller 10 has e.g. a microcomputer. Further, the controller 10 on/off controls the light emitting diodes 4.

A facing plate 7 is attached to the front surface side of the liquid crystal panel 2. The facing plate 7 is formed in an approximately frame shape with resin material or the like, and provided in close contact with the outer periphery of the liquid crystal panel 2. A transparent cover 8 is attached to an end of the facing plate 7 on the viewer side (the left side in FIG. 2). The transparent cover 8 is formed with a thin plate of translucent material such as acryl resin or polycarbonate resin. The transparent cover 8 prevents entrance of foreign substance (dust, water droplets and the like) into the combination meter 1 and maintains the surface of the liquid crystal panel 2 clean.

A casing 6 is provided in the rear of the facing plate 7 (the right side in FIG. 2). The casing 6 is formed of resin material or the like. The casing 6 fixedly accommodates the above-described liquid crystal panel 2, the printed circuit board 5 and the like.

A lower cover 9 is provided in the rear of the casing 6 (the right side in FIG. 2). The lower cover 9 covers an opening on the rear end side of the casing 6, thus prevents entrance of dust, water and the like into the casing 6.

Next, the electric circuit configuration of the combination meter 1 will be described based on FIG. 5.

As shown in FIG. 5, in the combination meter 1, the controller 10 is always supplied with electric power from a battery 12. Further, an ignition switch 11 is connected to the controller 10 such that the ignition switch 11 can detect the operation status (ON/OFF) of the controller 10. The liquid crystal panel 2 and the light emitting diodes 4 are connected to the controller 10. The vehicle speed sensor 13 to detect the running speed of the vehicle is connected to the controller 10 such that the vehicle speed sensor 13 can input a detection signal into the controller 10. The vehicle speed sensor 13 detects the number of revolutions of an output shaft of a transmission, e.g., the number of revolutions of a propeller shaft. The navigation system device 14 is connected to the controller 10 such that the navigation system device 14 can input a course indication information signal into the controller 10.

Next, the operation of the combination meter 1 will be described.

When the ignition switch 11 is turned ON by the driver, the controller 10 detects the turning-on of the ignition switch 11 and controls the combination meter 1 to an operation status. That is, the controller 10 controls the liquid crystal panel 2 to an operation status and turns on the light emitting diodes 4. When the liquid crystal panel 2 has become into the operation status, the following three images are formed on the image screen 21. First, the speedometer S having the numeral characters 22 and the pointer 23 is formed, and the running speed of the vehicle calculated by the controller 10 based on the detection signal from the vehicle speed sensor 13 is displayed. Secondly, the navigation guide N having the course arrow 25 and the like is formed, and the course of the vehicle calculated by the controller 10 based on the course indication information signal from the navigation system device 14 is displayed as the course arrow 25. Thirdly, the illumination image A to illuminate the transparent ring 15a of the decorative ring 15 is formed. The transparent ring 15a is transmission-illuminated with light emitted from the illumination image A, thereby light-emission displayed. At this time, in the illumination image A, the pointing indicator 26 is formed in a position extended from the pointer 23 of the speedometer S, and the course arrow indicator 27 is formed in a position extended from the course arrow 25 of the navigation guide N. In the illumination image A, the luminescence intensity of the pointing indicator 26 and the course arrow indicator 27 is higher than that of their surrounding areas. The luminescence intensity of the pointing indicator 26 and the course arrow indicator 27 is set to, e.g., a level at which the indicators are distinctly bright to the driver.

Next, the characteristic features of the combination meter 1, i.e., the advantages of the decorative ring 15 as a decorative member, and advantages of use of the pointing indicator 26 and the course arrow indicator 27 as high luminosity members, will be described.

In the combination meter 1, as the decorative ring 15 is provided on the front surface side of the liquid crystal panel 2, i.e., the driver side, the surface of the transparent ring 15a of the decorative ring 15 is projected to the front surface side from the image screen 21 of the liquid crystal panel 2. When the transparent ring 15a is transmission-illuminated with light from the illumination image A on the liquid crystal panel 2, the surface of the transparent ring 15a is visually recognized as a bright light-emitting surface. In this arrangement, the appearance of the combination meter 1 can be fully solid. Further, the pointing indicator 26 is formed in a position extended from the pointer 23 of the speedometer S and the course arrow indicator 27 is formed in a position extended from the course arrow 25 of the navigation guide N, respectively as high luminosity members, on the illumination image A. As shown in FIG. 1, the decorative ring 15, more particularly, the trim ring 15b on the inner peripheral side of the decorative ring 15, is away from the distal ends of the pointer 23 and the course arrow 25. In this arrangement, the pointer 23 and the pointing indicator 26 are visually recognized completely separately as two displays, and the course arrow 25 and the course arrow indicator 27 are visually recognized completely separately as two displays. Accordingly, the running speed of the vehicle is indicated with the two indicating figures, the pointer 23 and the pointing indicator 26, and the course to a destination is indicated with the two indicating figures, the course arrow 25 and the course arrow indicator 27. In this arrangement, the driver can accurately read the running speed and the course of the vehicle, and novel appearance of the combination meter 1 can be obtained.

Second Embodiment

Next, the combination meter 1 according to a second embodiment of the present invention will be described.

Figure 7:
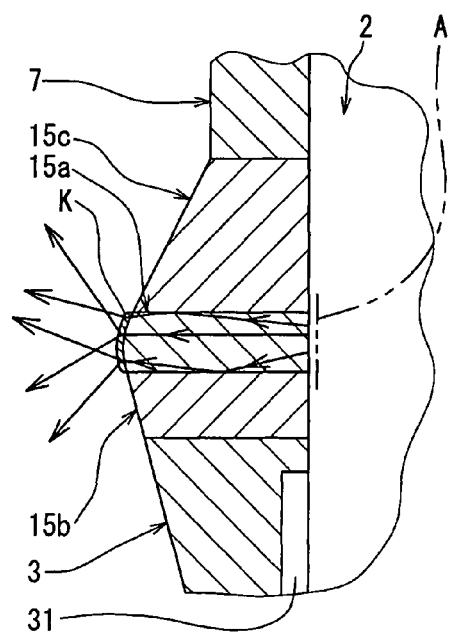
FIG. 7 is a partial cross-sectional view of the combination meter as the display device according to a second embodiment of the present invention.

In the combination meter 1, in comparison with the combination meter 1 according to the first embodiment of the present invention, an embossed surface K as a diffuse reflection layer is formed on the surface of the front surface side of the transparent ring 15a of the decorative ring 15 as shown in FIG. 7. The embossed surface K has a large number of fine convexities and concavities formed by e.g. mold-transfer upon formation of the transparent ring 15a by mold processing of resin material. Other diffuse reflection layer than the embossed surface K may be provided as the diffuse reflection layer. For example, a bright color layer may be provided. Otherwise, a resin sheet having a diffuse reflection layer may be attached to the surface of the transparent ring 15a. As shown in FIG. 7, when the light emitted from the illumination image A proceeds in the transparent ring 15a to the surface on the front surface side and to the embossed surface K, the light is diffuse-reflected with the embossed surface K, and goes out in a wide range expanded from an angle of the light immediately before the incident on the embossed surface K. In this arrangement, even when the attitude of the driver as a viewer is changed, the transparent ring 15a, i.e., the decorative ring 15 can always be visually recognized as a bright member by the driver. Accordingly, novel appearance of the combination meter 1 can be obtained.

In the combination meter 1 according to the above-described first and second embodiments, the trim rings 15b and 15c of the decorative ring 15 are formed of ABS resin and are coated with the chrome plate layer P so as to obtain an opaque characteristic, however, the combination of the materials is not limited to the above-described ABS resin and chrome plate layer. A light shield coating layer may be provided in place of the chrome plate layer, or the ABS resin itself may be colored. Further, other resin may be used in place of the ABS resin, otherwise, the trim ring 15b and 15c may be formed of metal material such as aluminum, stainless steel or the like in place of resin.

Further, in the combination meter 1 according to the above-described first and second embodiments, the display stylish parts provided in the scale ring 3 as a stylish member are the scale marks 31. However, numeral characters may be provided in place of the scale marks 31.

Further, in the combination meter 1 according to the above-described first and second embodiments, the scale ring 3 is provided on the liquid crystal panel 2, and the scale marks 31 of the speedometer S are formed in the scale ring 3. However, it may be arranged such that the scale ring 3 is omitted, and the scale marks of the speedometer S are formed as an image on the image screen 21 of the liquid crystal panel 2.

Further, in the combination meter 1 according to the above-described first and second embodiments, the images formed on the image screen 21 of the liquid crystal panel 2 are the speedometer S and the navigation guide N. However, the combination of the images is not limited to the speedometer S and the navigation guide N, but at least one of the speedometer S and the navigation guide N may be replaced with another type of display image, e.g., a tachometer to indicate an engine speed of the vehicle or a fuel gauge to indicate the amount of remaining fuel in a fuel tank.

Further, in the combination meter 1 according to the above-described first and second embodiments, the shape of the speedometer S is a round shape, and the plane shape of the decorative ring 15 is a round shape (circular arc) in correspondence with the shape of the speedometer S. However, the shape is not limited to the round shape, but another shape may be employed. For example, the both members may be formed in an oval shape.

Further, in the above-described first and second embodiments, the display device is applied to the combination meter 1 mounted in a vehicle, however, the display device is not limited to a vehicle display device. The present device may be applied to a display device incorporated in household appliances and the like.

Third Embodiment

Figure 8:
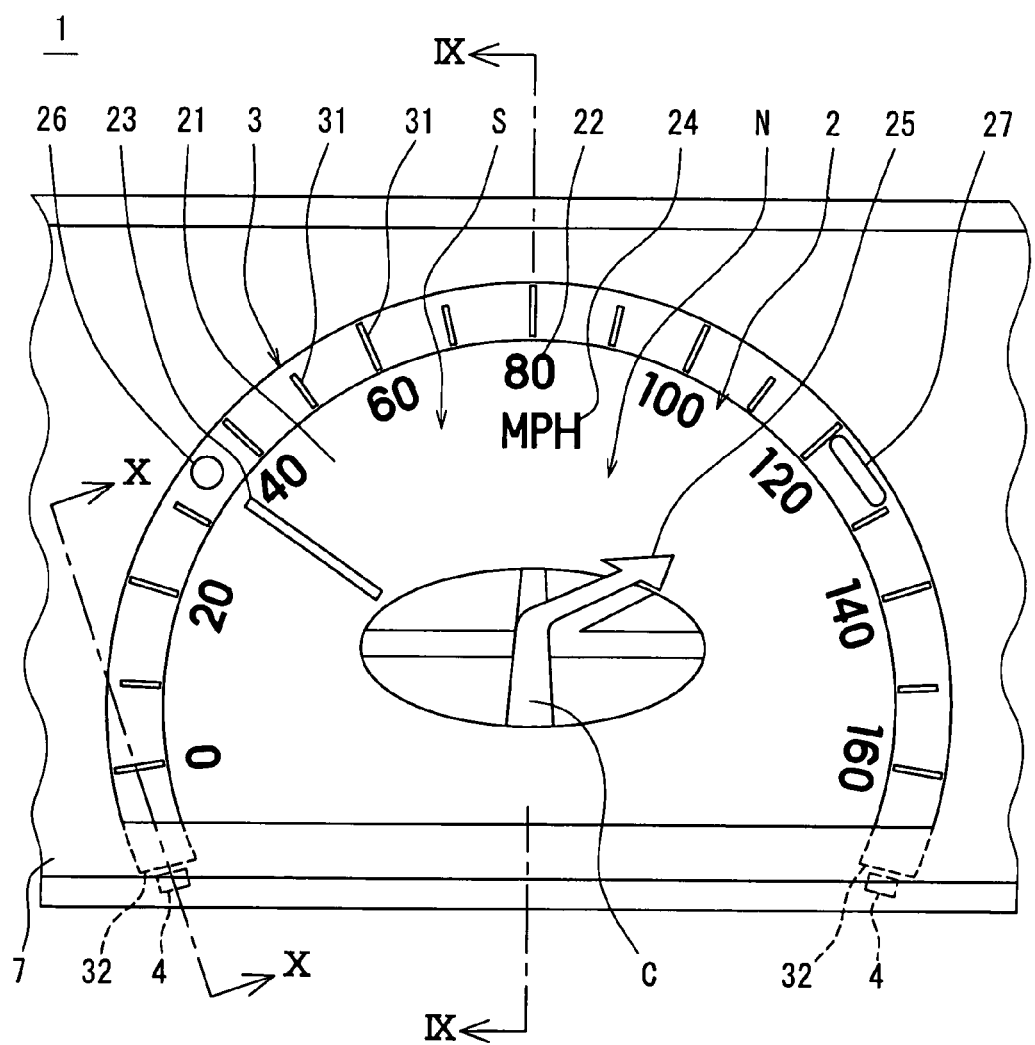
FIG. 8 is a partial front view of a combination meter 1 as a display device according to a third embodiment of the present invention.
Figure 9:
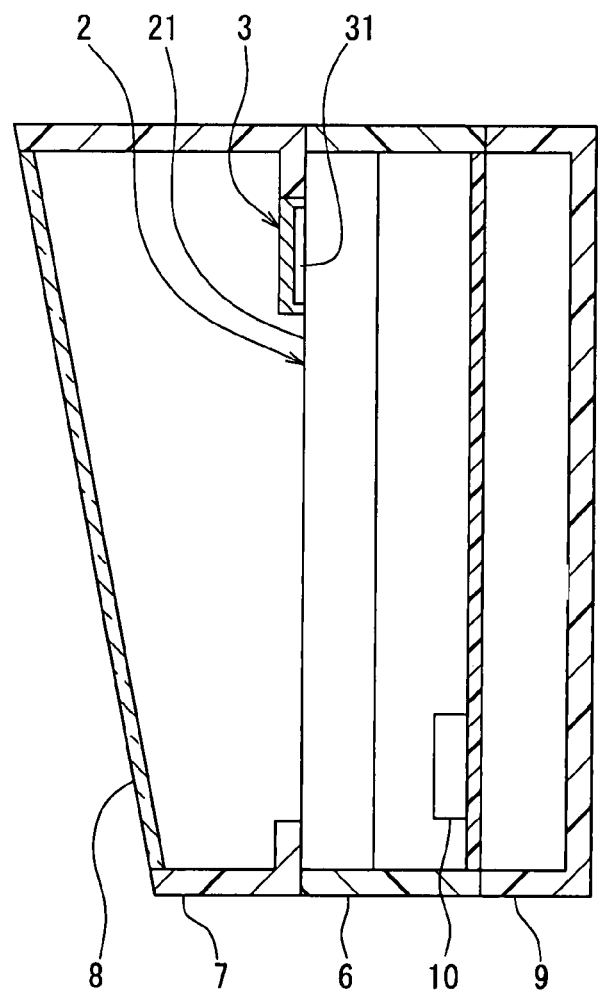
FIG. 9 is a cross-sectional view along a line IX-IX in FIG. 8.
Figure 10:
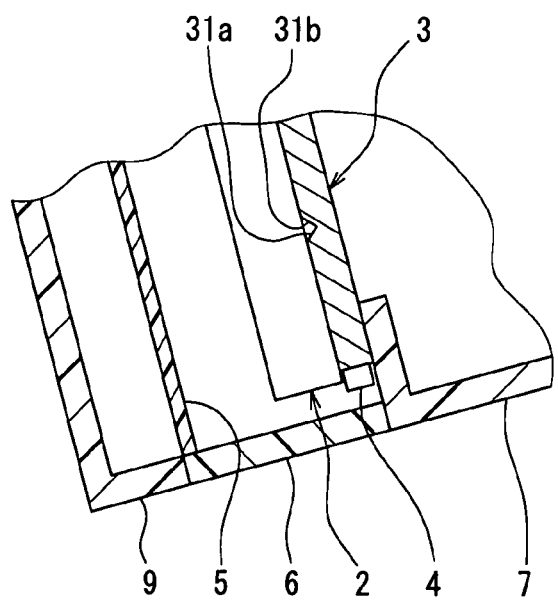
FIG. 10 is a cross-sectional view along a line X-X in FIG. 8.

FIGS. 8-10 shows a combination meter according to a third embodiment of the present invention.

As shown in FIG. 8, in the image screen 21 of the liquid crystal panel 2, a pointing indicator 26 in a spot shape, as a high luminosity member with luminosity higher than that of its surrounding area, is formed as an image, in a position extended from the pointer 23 and on the scale ring 3. The pointing indicator 26 rotates about the virtual center C always integrally with the pointer 23. That is, the line-shaped pointer 23 and the high luminosity spot-shaped pointing indicator 26 in cooperation indicate the running speed. In this arrangement, novel appearance of the speedometer S can be obtained, and the visibility of the speedometer S can be improved.

Further, as shown in FIG. 8, in the image screen 21 of the liquid crystal panel 2, a course arrow indicator 27 in a line shape, as a high luminosity member with luminosity higher than that of its surrounding area, is formed as an image, in a position extended from the course arrow 25 and on the scale ring 3. The course arrow indicator 27 is formed in a line or a circular arc shape along the scale ring 3 having a predetermined length in the circumferential direction of the scale ring 3. That is, the course arrow 25 and the high luminosity line-shaped course arrow indicator 27 in cooperation indicate the course to travel. In this arrangement, novel appearance of the navigation guide N can be obtained, and the visibility of the navigation guide N can be improved.

When the ignition switch 11 is turned ON by the driver, the controller 10 detects the turning-on of the ignition switch 11 and controls the combination meter 1 to an operation status. First, the controller 10 controls the liquid crystal panel 2 to an operation status and turns on the light emitting diodes 4. Further, the controller 10 calculates a running speed of the vehicle based on a detection signal from the vehicle speed sensor 13, and drives the liquid crystal panel 2 to display the running speed in the speedometer S on the image screen 21. At the same time, the controller 10 displays the course arrow 25 in the navigation guide N based on the course indication information signal from the navigation system device 14.

At this time, the controller 10 drives the liquid crystal panel 2, to form the pointing indicator 26 in a position extended from the pointer 23 of the speedometer S, and the course arrow indicator 27 in a position extended from the course arrow 25 of the navigation guide N, on the image screen 21.

Next, the characteristic features of the combination meter 1, particularly, the advantages of the scale ring 3 as a stylish member, and the advantages of use of the pointing indicator 26 and the course arrow indicator 27 as high luminosity members, i.e., the advantages of improvement of the appearance of the combination meter 1 and the like will be described.

In the combination meter 1, the scale marks 31 provided in the scale ring 3 are light-emission displayed by illumination with, not light from the image screen 21 of the liquid crystal panel 2, but light from the specially-provided light emitting diodes 4. That is, as the light from the light emitting diodes 4, proceeding in the scale ring 3 along the image screen 21 of the liquid crystal panel 2, is reflected with the slopes 31a and 31b, the scale marks 31 are visually recognized. Accordingly, in the area of the scale ring 3, only the scale marks 31 are light-emission displayed, and the background part is not illuminated, thereby the scale marks 31 can be highlighted and clearly visually recognized.

In the case of the conventional display device, as the scale marks are transmission-illuminated with light from the liquid crystal panel screen in the rear of the scale ring, a peripheral area of the scale marks is simultaneously illuminated. Thus the appearance of the scale marks may be monotonous. Otherwise, a bright image for scale mark illumination is formed in only a position corresponding to the scale marks of the liquid crystal panel such that the scale marks are illuminated with the image. In this case, as the scale ring is provided on the liquid crystal panel, a positional shift may occur between the illumination image and the scale marks, thereby the appearance of the scale marks may be degraded.

On the other hand, in the combination meter 1, as described above, the scale marks 31 can be highlighted and clearly visually recognized. Accordingly, the combination meter 1 with novel appearance can be realized.

Further, in the combination meter 1, the two high luminosity members are formed in positions on the scale ring 3 in a visual recognition direction of the image screen 21 of the liquid crystal panel 2. That is, the pointing indicator 26 is formed in a position extended from the pointer 23 of the speedometer S, and the course arrow indicator 27 is formed in a position extended from the course arrow 25 of the navigation guide N. The pointing indicator 26 moves integrally with the pointer 23 in accordance with the rotation of the pointer 23, and the course arrow indicator 27 moves integrally with the course arrow 25 in accordance with the change of direction indicated with the course arrow 25. In this arrangement, the driver can accurately read the running speed and the course of the vehicle. Further, the appearance of the speedometer S and that of the navigation guide N can be novel.

Fourth Embodiment

Figure 11:
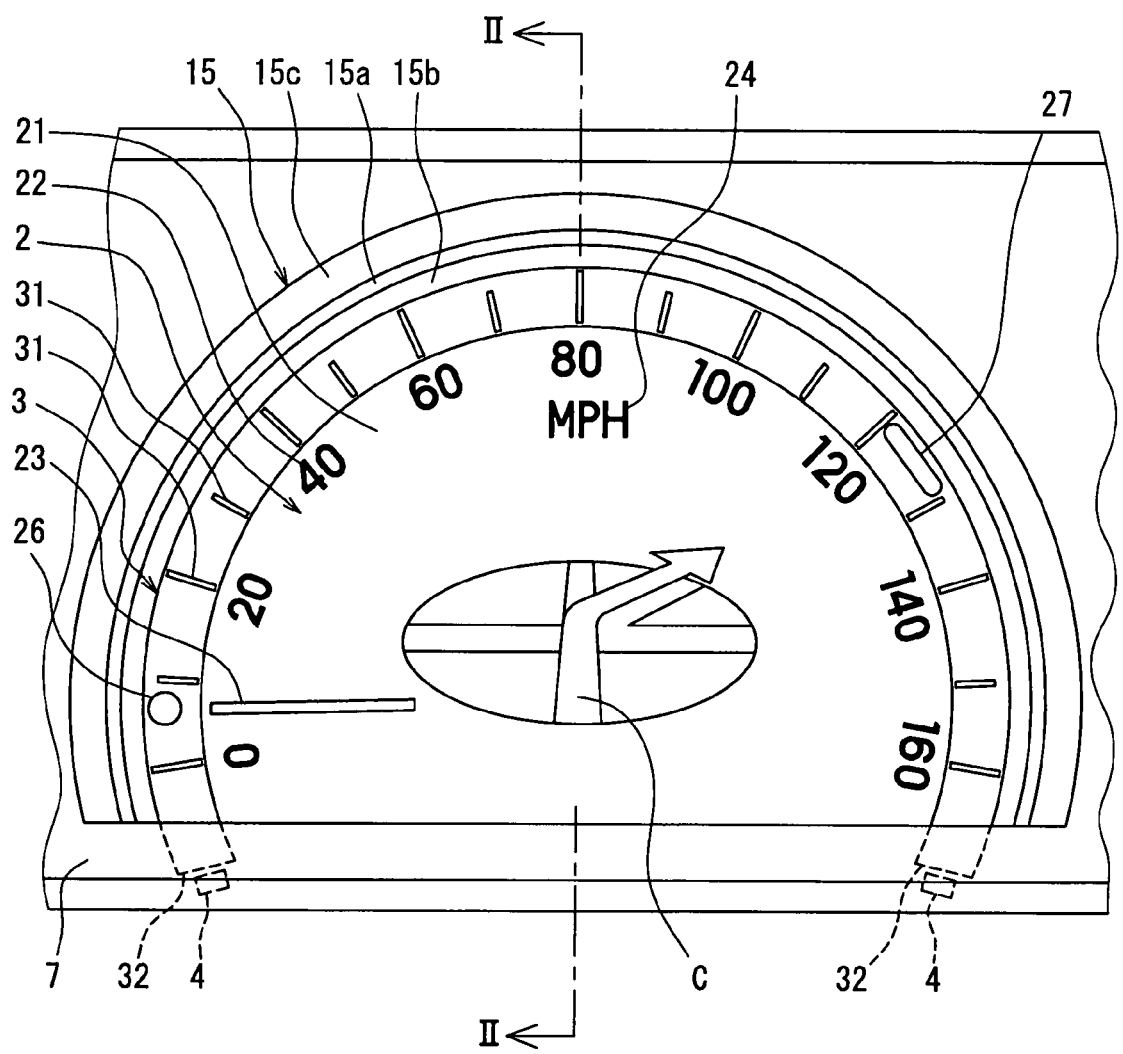
FIG. 11 is a partial front view of the combination meter 1 as the display device according to a fourth embodiment of the present invention.

As shown in FIG. 11, in the combination meter 1 according to a fourth embodiment of the present invention, a decorative ring 15 as a decorative member is added on the outer peripheral side of the scale ring 3. The other constituent elements than the decorative ring 15 are identical to those of the above-described combination meter 1 according to the third embodiment of the present invention. Accordingly, the structure and advantages of the decorative ring 15 will be mainly described.

As shown in FIG. 11, the decorative ring 15 as a whole is formed in a circular arc shape coaxially with the scale ring 3. As in the case of the scale ring 3, the decorative ring 15 is attached in close contact with the surface of the liquid crystal panel 2 as shown in FIG. 9. The decorative ring 15 is formed with a trim ring 15b as an opaque member, a transparent ring 15a as a translucent member, and a trim ring 15c as an opaque member, sequentially arranged from the scale ring 3 side toward its outer peripheral side, attached in close contact with each other.

The transparent ring 15a is formed of transparent and colorless acryl resin, polycarbonate resin or the like. The trim rings 15b and 15c are formed of chrome plated ABS resin or the like so as to have a light shielding property. The transparent ring 15a, the trim ring 15b and the trim ring 15c are fixed, with the entire areas of their respective surfaces in close contact, with each other.

Figure 6:
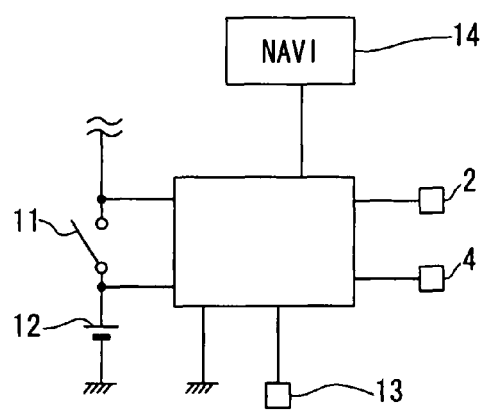
FIG. 6 is a schematic block diagram showing the electric circuit configuration of the combination meter according to the first embodiment of the present invention.

As shown in FIG. 6, in the screen image 21 of the liquid crystal panel 2, an illumination image A is formed in a part overlapped with the transparent ring 15a or a part slightly wider than the part overlapped with the transparent ring 15a. The transparent ring 15a is transmission-illuminated with light emitted from the illumination image A, thereby light-emission displayed. That is, the illumination image A functions as a light source to light-emission display the transparent ring 15a of the decorative ring 15. Thus the decorative ring 15 is visually recognized, with metallic lustrous trim rings 15b and 15c on both sides of the transparent ring 15a, light-emission displayed in a circular arc shape, like a bordering.

As described above, in the combination meter 1, as the decorative ring 15 is provided on the outer peripheral side of the scale ring 3, more novel appearance of the combination meter 1 can be provided.

The light emitted from the illumination image A enters the transparent ring 15a, and as shown in FIG. 6, a part of the light proceeds, while repeatedly reflected with wall surfaces of the transparent ring 15a, to the outside from the transparent ring 15a.

In this manner, the light emitted from the illumination image A proceeds while repeatedly reflected with the wall surfaces of the transparent ring 15a. Even in an arrangement where the length of projection of the transparent ring 15a from the liquid crystal panel 2 ("H" in FIG. 6) is increased, as the light entered in the transparent ring 15a from the illumination image A is guided to the front surface of the transparent ring 15a and to the outside with high efficiency, the luminescence intensity of the transparent ring 15a can be increased. In this arrangement, the transparent ring 15a is brightly light-emission displayed while the solid impression of the decorative ring 15 is emphasized by increasing the length of projection of the transparent ring 15a from the liquid crystal panel 2, thereby novel appearance of the combination meter 1 can be obtained.

In the combination meter 1 according to the above-described third and fourth embodiments of the present invention, the images formed on the image screen 21 of the liquid crystal panel 2 are the speedometer S and the navigation guide N. However, the combination of the images is not limited to the speedometer S and the navigation guide N, but at least one of the speedometer S and the navigation guide N may be replaced with another type of display image, e.g., a tachometer to indicate an engine speed of the vehicle or a fuel gauge to indicate the amount of remaining fuel in a fuel tank.

Further, in the combination meter 1 according to the above-described third and fourth embodiments of the present invention, the display stylish parts provided in the scale ring 3 as a stylish member are the scale marks 31. However, numeral characters may be provided in place of the scale marks 31.

Further, in the combination meter 1 according to the above-described third and fourth embodiments of the present invention, the scale ring 3 is colorless and transparent, however, the scale ring 3 may be formed of a colored translucent material.

Further, in the combination meter 1 according to the above-described third and fourth embodiments of the present invention, the shape of the speedometer S is a round shape, and the plane shape of the scale ring 3 is a round shape in correspondence with the shape of the speedometer S. However, the shape is not limited to the round shape, but another shape may be employed. For example, the both members may be formed in an oval shape.

Further, in the combination meter 1 according to the above-described third and fourth embodiments of the present invention, the light source to illuminate the scale ring 3 is the light emitting diodes 4. The light source is not limited to the light emitting diodes 4, but any other type of light source such as a lamp bulb, an electric discharge tube or an EL panel may be employed.

Further, in the above-described third and fourth embodiments of the present invention, the display device is applied to the combination meter 1 mounted in a vehicle, however, the display device is not limited to a vehicle display device. The present invention may be applied to a display device incorporated in household appliances and the like.

Fifth Embodiment

Figure 12:
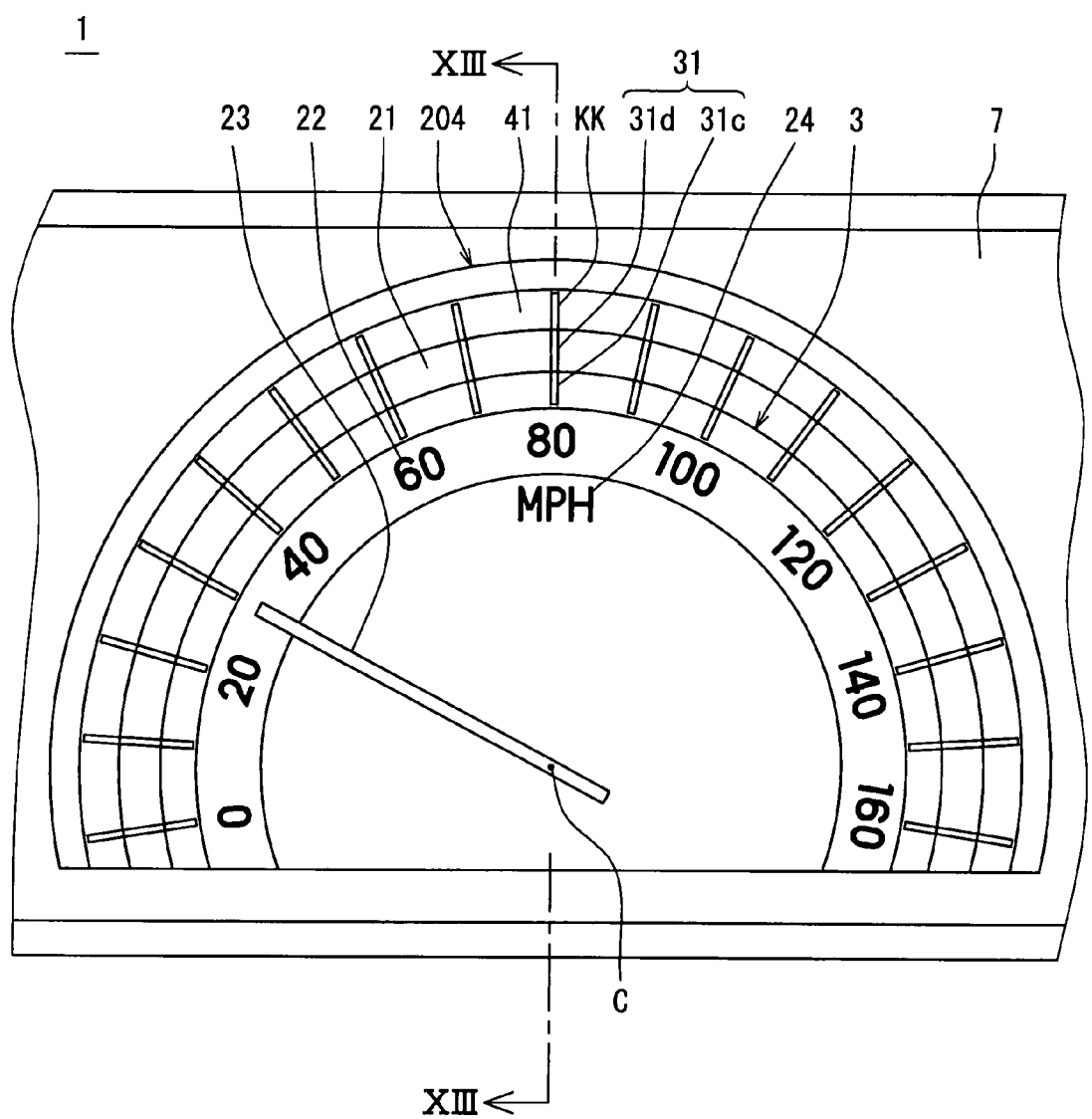
FIG. 12 is a partial front view of a combination meter 1 as a display device according to a fifth embodiment of the present invention.
Figure 13:
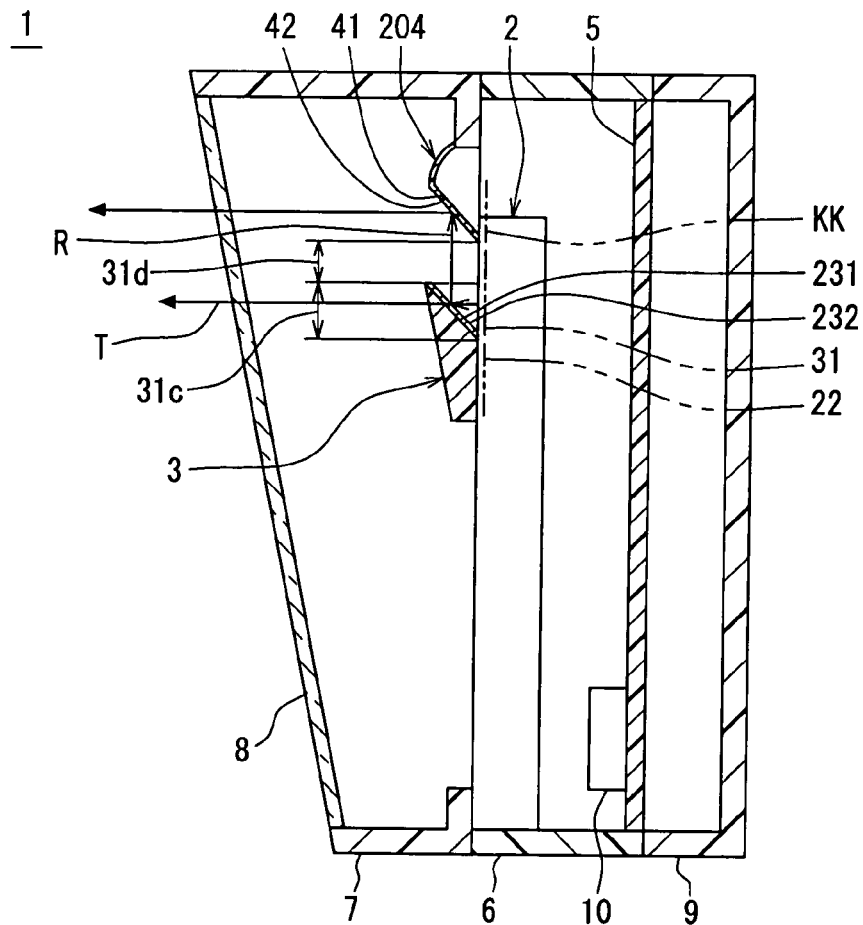
FIG. 13 is a cross-sectional view along a line XIII-XIII in FIG. 12.
Figure 14:
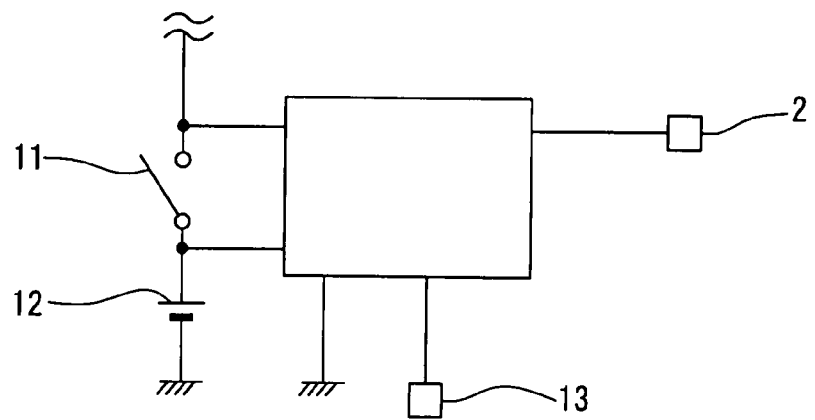
FIG. 14 is a schematic block diagram showing the electric circuit configuration of the combination meter 1 according to the fifth embodiment of the present invention.

FIGS. 12-14 show a combination meter 1 according to a fifth embodiment of the present invention.

The transparent ring 3 as a scale ring has a reflecting surface 31 as a first reflecting surface to reflect display light from the scale marks 31 as first display stylish parts associated with the speedometer S in a direction along the image screen 21 of the liquid crystal panel 2 (upward in FIG. 13). As shown in FIG. 13, the reflecting surface 231 is a slope in which an end on the inner peripheral side of the transparent ring 3 is in contact with the liquid crystal panel 2 and is gradually away from the image screen 21 of the liquid crystal panel 2 toward the outer peripheral side of the transparent ring 3. As shown in FIG. 13, the end of the reflecting surface 231 on the inner peripheral side of the transparent ring 3 is in contact with ends of the scale marks 31 on the image screen 21 of the liquid crystal panel 2, more particularly, ends on the virtual enter C side. A half mirror layer 232 as a beam splitter layer is formed on the reflecting surface 231. The half mirror layer 232 is formed by, e.g., forming a dielectric multilayer film on the reflecting surface 231 by coating, or attaching a thin sheet coated with a dielectric multilayer film to the reflecting surface 231. The half mirror layer 232 splits incident light into reflected light and transmitted light, at an intensity ratio of approximately 1:1 between the reflected light and transmitted light. When light emitted from the scale marks 31 enters the half mirror layer 232, the light is split into reflected light R and transmitted light T. As shown in FIG. 13, the reflected light R proceeds in a direction along the image screen 21 of the liquid crystal panel 2 and enters a mirror ring 204 as a reflecting member to be described later. On the other hand, the transmitted light T passes through the half mirror layer 232 and the transparent ring 3, proceeds in the direction of a viewer, and is visually recognized.

As shown in FIGS. 12 and 13, in the transparent ring 3, a surface in close contact with the liquid crystal panel 2 covers the numeric characters 22, and the reflecting surface 231 covers a part of the scale marks 31 in a visual recognition direction. In this arrangement, the numeric characters 22 on the liquid crystal panel 2 are visually recognized through the transparent ring 3. In the scale marks 31 on the liquid crystal panel 2, a part on the inner peripheral side is visually recognized through the half mirror layer 232 and the transparent ring 3, and a part on the outer peripheral side is directly visually recognized. That is, as shown in FIG. 12, the scale marks 31 respectively include a transmission visual recognition member 31c transmitted through the half mirror layer 232 and the transparent ring 3 and a direct visual recognition member 31d directly visually recognized.

On the front surface side of the liquid crystal panel 2 (left side in FIG. 13), the mirror ring 204 as a reflecting member is provided on the liquid crystal panel 2 as shown in FIG. 13, on the outer peripheral side of the transparent ring 3. The mirror ring 204 has a reflecting surface 41 as a second reflecting surface to reflect the reflected light R from the reflecting surface 231 of the transparent ring 3, i.e., the reflected light R from the half mirror layer 232, toward the viewer side (the left side in FIG. 13). The mirror ring 204 is formed of e.g. ABS resin, and is coated with a chrome plate layer 42 on at least the reflecting surface 41 and a portion viewed from the driver. Thus the reflecting surface 41 has high light reflectance.

In the mirror ring 204, an end of the reflecting surface 41 on the inner peripheral side of the mirror ring 204 is in contact with an outer peripheral edge of the speedometer S as an image, i.e., as shown in FIG. 13, ends of the scale marks 31 on the image screen 21 of the liquid crystal panel 2, more particularly, ends on the opposite side to the virtual center C. In FIG. 13, the scale marks 31 are formed in an outermost end portion within an image formation range in the liquid crystal panel 2.

As shown in FIG. 13, the reflected light R from the reflecting surface 231 of the transparent ring 3 is again reflected with the reflecting surface 41 of the mirror ring 204, and proceeds toward the viewer side. Thus, as shown in FIG. 13, the viewer visually recognizes a reflected virtual image KK of the reflected light R from the reflecting surface 231 image-formed on the reflecting surface 41, i.e., a reflected virtual image KK of the transmission visual recognition member 31c of the scale mark 31. The reflected light R from the reflecting surface 231 is reflected on the reflecting surface 41 so that the reflected virtual image KK is obtained. As described above, as the end of the reflecting surface 41 on the inner peripheral side of the mirror ring 204 is in contact with the outer peripheral edge of the speedometer S as an image, i.e., the ends of the scale marks 31, the scale mark 31, more particularly the direct visual recognition member 31d and the reflected virtual image KK are visually recognized as a continuous image. That is, the scale mark 31 as a real image and the reflected virtual image KK are visually recognized as an integrally connected image, and as shown in FIG. 12, visually recognized as one line.

Next, the operation of the combination meter 1 will be described.

When the ignition switch 11 is turned ON by the driver, the controller 10 detects the turning-on of the ignition switch 11 and starts operation control of the combination meter 1, thereby the liquid crystal panel 2 becomes into an operation status. When the liquid crystal panel 2 has become into the operation status, four images forming the speedometer S, the numeric characters 22, the scale marks 31, the characters 24 and the pointer 23 are formed on the image screen 21. Further, the pointer 23 is rotated to an angle position indicating the running speed of the vehicle calculated by the controller 10 based on a detection signal from the vehicle speed sensor 13.

Next, the characteristic features of the combination meter 1, i.e., the advantages of use of the transparent ring 3 as a decorative member and the mirror ring 204 as a reflecting member will be described.

In the combination meter 1, light from the scale marks 31 is reflected with the reflecting surface 231 of the transparent ring 3 in the direction along the image screen 21 of the liquid crystal panel 2. This reflected right R is reflected with the reflecting surface 41 of the mirror ring 204 in the viewer direction, thereby the driver visually recognizes the reflected virtual image KK of the scale marks 31 image-formed on the reflecting surface 41. Further, the reflecting surface 41 is provided in contact with the end of the scale marks 31 as an outer peripheral edge of the speedometer S. Accordingly, the driver visually recognizes the both of the real image of the scale marks 31 and the reflected virtual image KK of the scale mark 31 image-formed on the outer peripheral side of the real image of the scale marks 31. At this time, the scale marks 31 and the reflected virtual image KK are visually recognized as respectively continuous lines. In this arrangement, as the visual recognition shape of the speedometer S can be enlarged to a shape larger than the display range of the liquid crystal panel 2, the display area of the speedometer S can be enlarged using the current liquid crystal panel 2 without use of liquid crystal panel with wider display range.

The scale marks of the speedometer S are formed with the combined real image of the scale marks 31 and reflected virtual image KK, and further, the real image of the scale marks 31 is respectively formed with the transmission visual recognition member 31c transmitted through the half mirror layer 232 and the direct visual recognition member 31d directly visually recognized. That is, the scale marks 31 respectively have the transmission visual recognition member 31c, the direct visual recognition member 31d, and the reflected virtual image KK, from the virtual center C side. As the brightness of the scale marks, the luminosity of the direct visual recognition member 31d as a central portion of the three members is the highest, then the luminosity of the transmission visual recognition member 31c and the reflected virtual image KK on both sides is lower in some degree. As the brightness of each scale mark is partially changed, novel appearance of the combination meter 1 can be obtained.

As described above, the combination meter 1 with novel appearance, in which increase in costs due to upsizing of liquid crystal device is suppressed, can be provided.

Sixth Embodiment

Next, the combination meter 1 according to a sixth embodiment of the present invention will be described.

Figure 15:
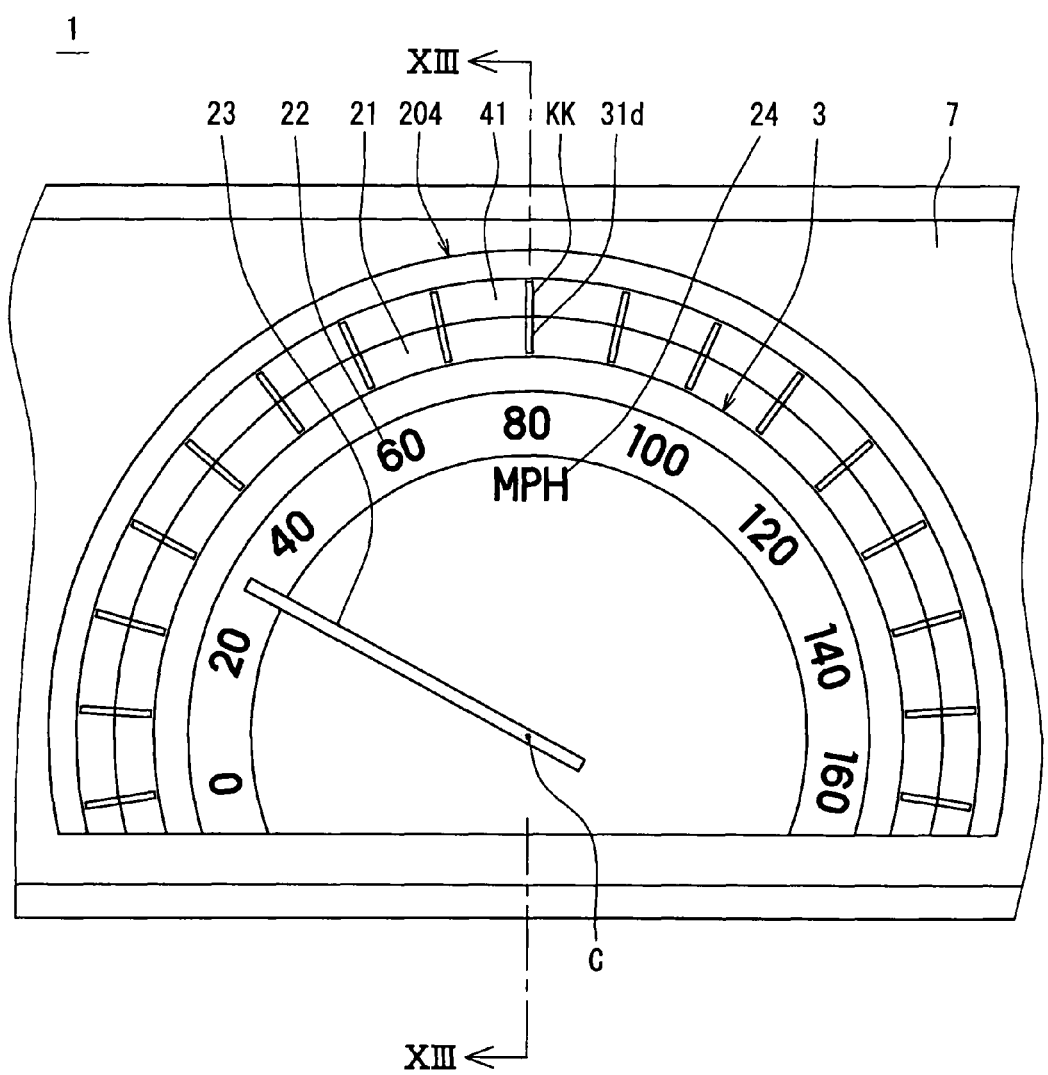
FIG. 15 is a partial front view of the combination meter 1 as the display device according to a sixth embodiment of the present invention.

In the combination meter 1, the half mirror layer 232 on the reflecting surface 231 of the transparent ring 3 in the combination meter 1 according to the fifth embodiment of the present invention is replaced with a chrome plate layer having a light shielding property. In this arrangement, the light from the scale marks 31 incident on the reflecting surface 231 is not transmitted through the reflecting surface 231. The transmission visual recognition member 31c in the combination meter 1 according to the fifth embodiment of the present invention cannot be seen. As shown in FIG. 15, the scale marks 31 of the speedometer S are respectively formed with the direct visual recognition member 31c and the reflected virtual image KK. Further, the reflecting surface 231 is visually recognized as a surface in a color of the chrome plate layer, i.e., a metallic mirror surface, through the transparent ring 3.

Also in the combination meter 1, the reflected virtual image KK of the scale marks 31 is connected to the outer peripheral side of the scale marks 31. Thus, the combination meter 1 with novel appearance, in which increase in costs due to upsizing of liquid crystal device is suppressed, can be provided.

Seventh Embodiment

Figure 16:
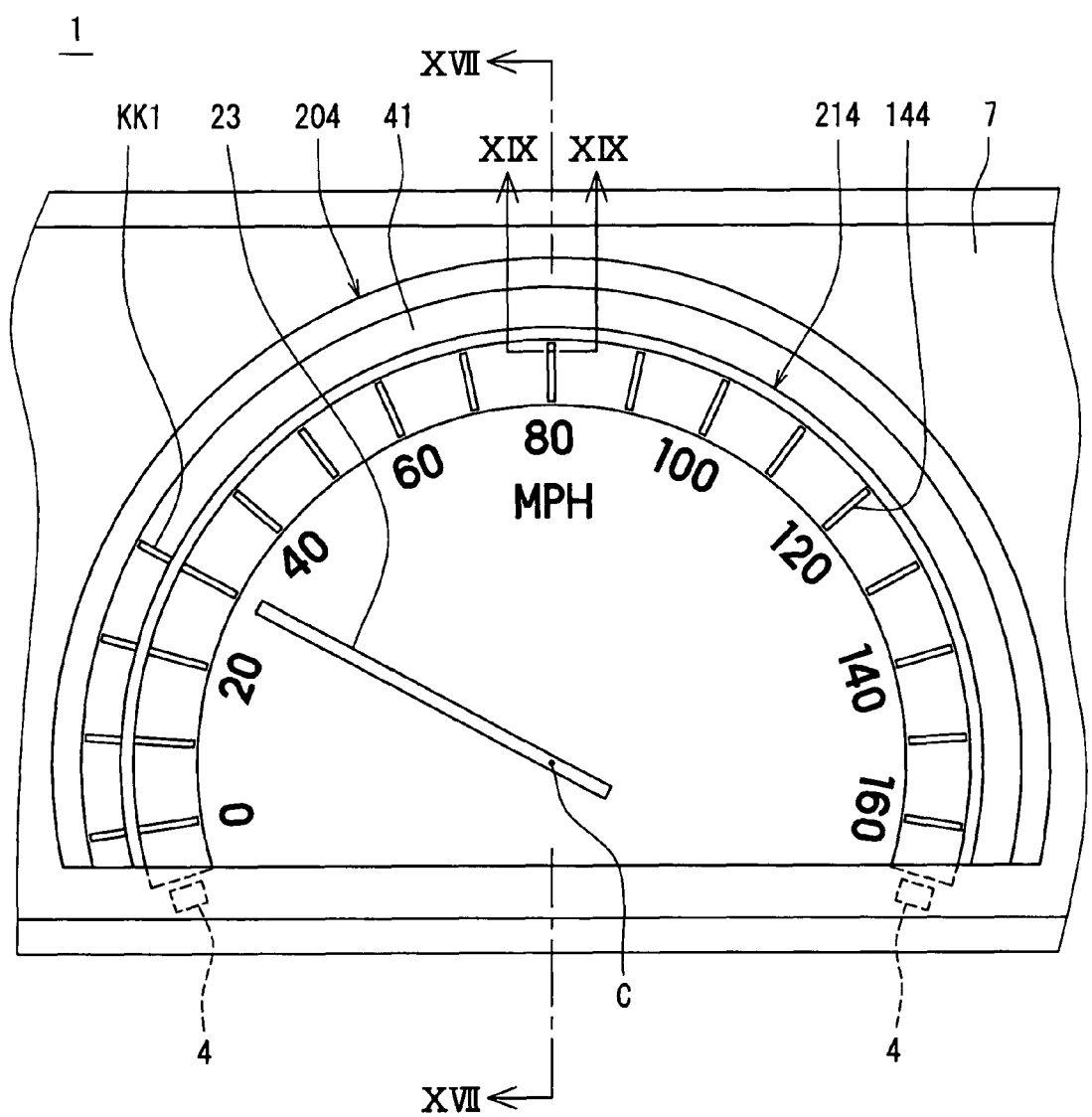
FIG. 16 is a partial front view of the combination meter 1 as the display device according to a seventh embodiment of the present invention.
Figure 17:
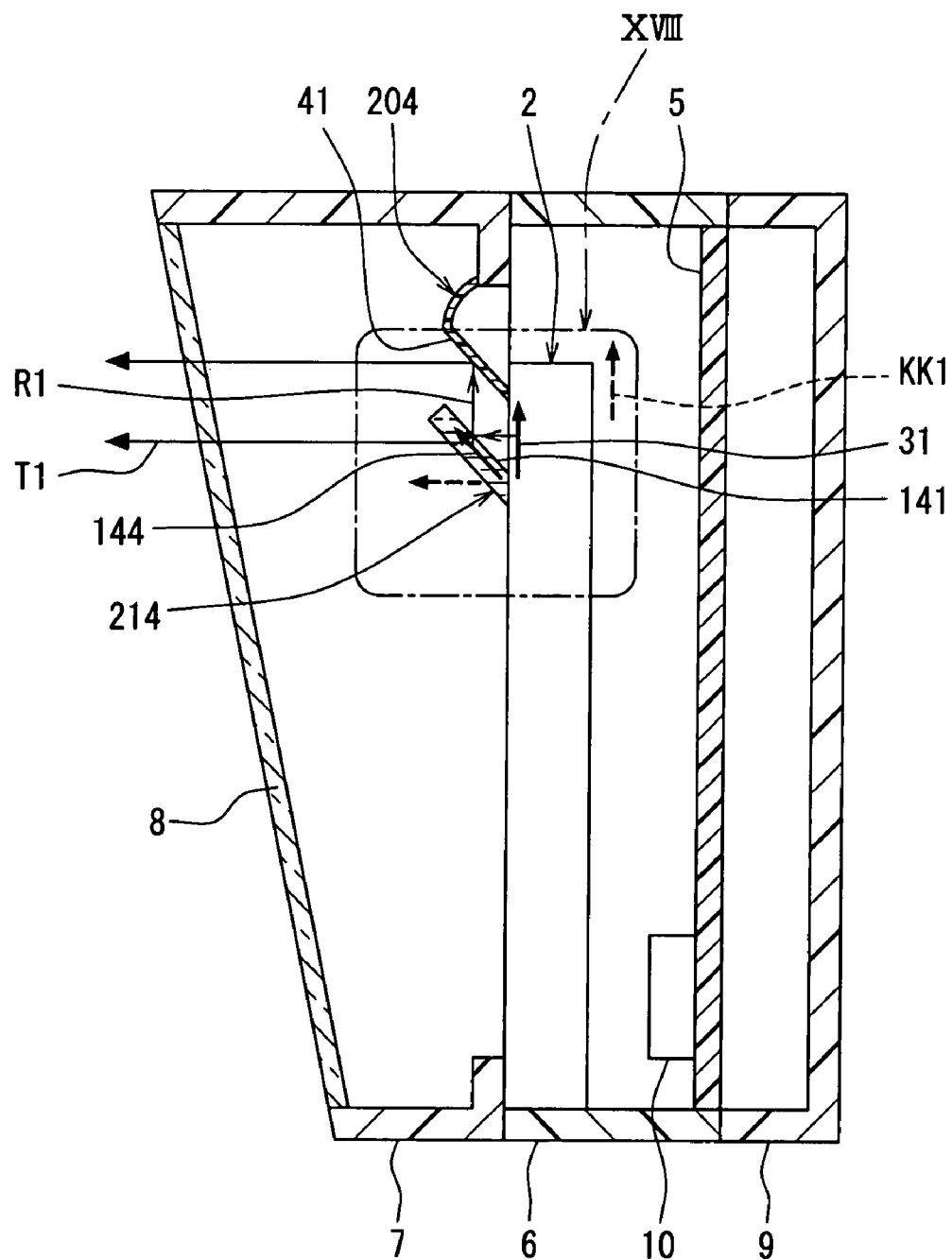
FIG. 17 is a cross-sectional view along a line XVII-XVII in FIG. 16.

A combination meter 1 according to a seventh embodiment of the present invention is shown in FIG. 16. The combination meter 1 in FIG. 16 has a scale ring 214 instead of the ring 3 in FIG. 12. In the scale ring 214 as an ornamental member, scale 144 as a second display design is formed. In the panel 2, the scale mark 31 is controlled to display in a region from a position of the pointer 23 toward a counter clockwise direction.

The scale mark 31 moving together with rotation of the pointer 23 is viewed on the reflecting surface 41 as the reflected virtual image KK1, which is movable together with the rotation of the pointer 23. Thus, when the pointer 23 rotates in a clockwise direction, the view region of the reflected virtual image KK1 expands in the clockwise direction. When the pointer 23 rotates in a counter clockwise direction, the view region of the reflected virtual image KK1 expands in the counter clockwise direction.

Figure 18:
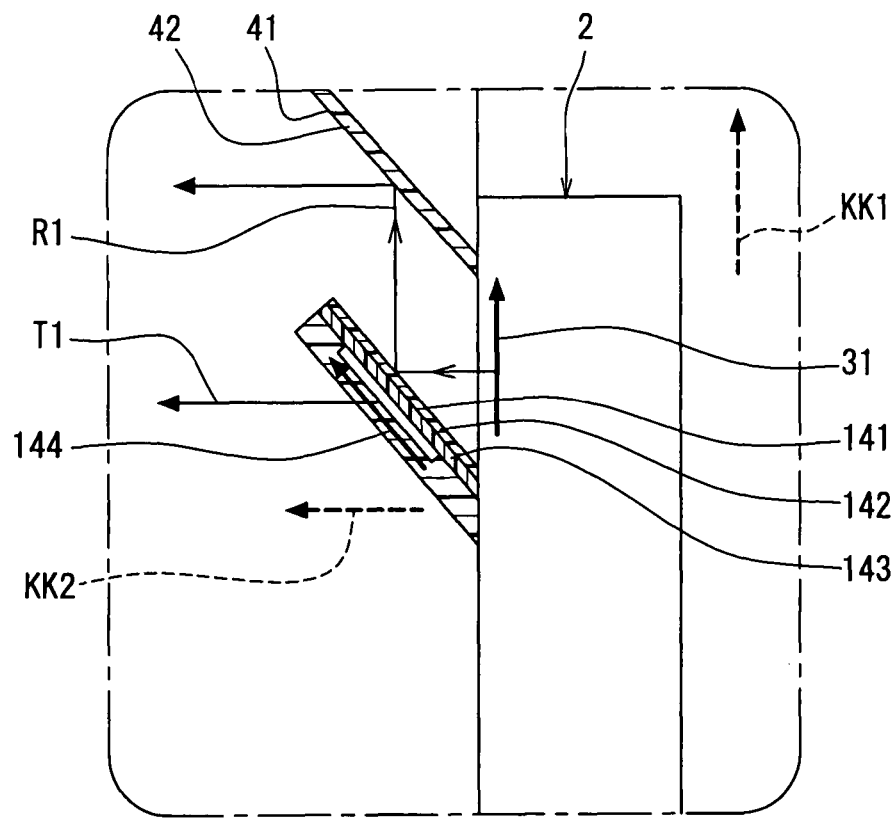
FIG. 18 is an enlarged view of a part XVIII in FIG. 17.
Figure 19:
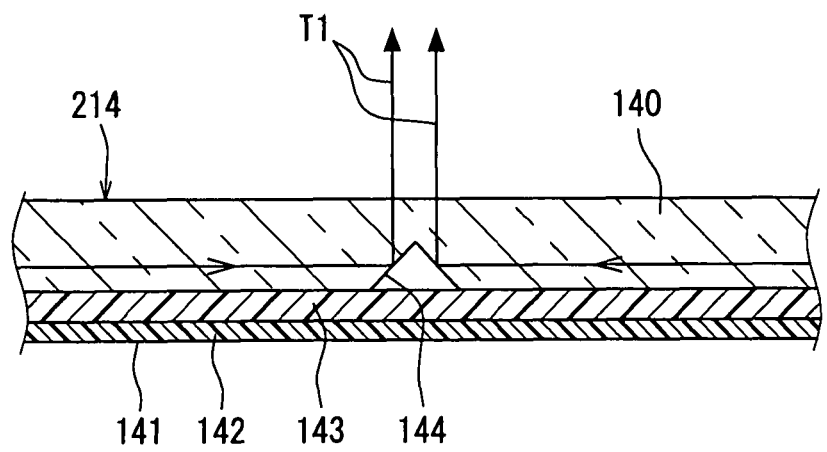
FIG. 19 is a cross-sectional view along a line XIX-XIX in FIG. 16.

In FIGS. 18 and 19, the scale ring 214 includes a ring body 140, a thin plate 143 and a chrome plate layer 142. The ring body 140 has translucent property and has a concavity corresponding to the shape of the scale 144. The concavity is disposed on a backside of the ring body 140. The thin plate 143 is bonded to the ring body 140 to cover the scale 144. The chrome plate layer 142 having light shielding property is formed on the backside of the thin plate 143. The upper surface of the chrome plate layer 142 provides a reflecting surface 141 as the first reflecting surface.

The light from the light emitting diode 15 proceeds in the scale ring 214 along with an arc of the scale ring 214. As shown in FIG. 19, the light is reflected on the scale 144 so that the reflected light transmits through the scale ring 214. The transmission light T1 transmitted through the scale ring 214 proceeds toward a viewer as a display side, and then, the transmission light T1 is viewed as a real image of the scale 144.

In FIG. 18, the display light of the scale mark 31 movable together with the rotation of the pointer 23 is reflected on the reflecting surface 141 so that the reflected virtual image KK2 is generated at a position plane symmetric to the scale mark 31 with respect to the reflecting surface 141 as a symmetric plane. The reflected light from the reflecting surface 141 is reflected on the reflecting surface 41, so that the reflected virtual image KK1 is generated at a position plane symmetric to the reflected virtual image KK2 with respect to the reflecting surface 41 as a symmetric plane.

The scale mark 31 movable together with the rotation of the pointer 23 is viewed on the reflecting surface 41 as the reflected virtual image KK1 movable together with the rotation of the pointer 23. Thus, the rotation of the pointer 23 can be recognized by both of the pointer 23 and the reflected virtual image KK1 movable together with the pointer 23. Accordingly, the rotation of the pointer 23 is easily recognized, so that the visibility of the combination meter 1 is improved.

Here, the reflected virtual image KK1 of the scale mark 31 is viewed outside of the periphery of the screen image. Thus, a space, i.e., clearance for displaying is provided on the scale ring 214. The scale 144 is formed on this space to use the space efficiently. Thus, the combination of the reflected virtual image KK1 movable together with the rotation of the pointer 23 and the real image of the scale 144 formed on the scale ring 214 provide to improve the visual quality of the combination meter 1.

In the combination meter 1, the reflected virtual image KK1 of the scale mark 31 is formed outside of the scale mark 31. Thus, the visual quality of the combination meter 1 is improved without increasing dimensions of the panel 2. Thus, the manufacturing cost of the meter 1 is limited.

Although the scale 144 is formed by the concavity, the scale 144 may be formed by a surface texture having fine concavity and convexity. In this case, the ring body 140 may have no thin plate 143.

Eighth Embodiment

Figure 20:
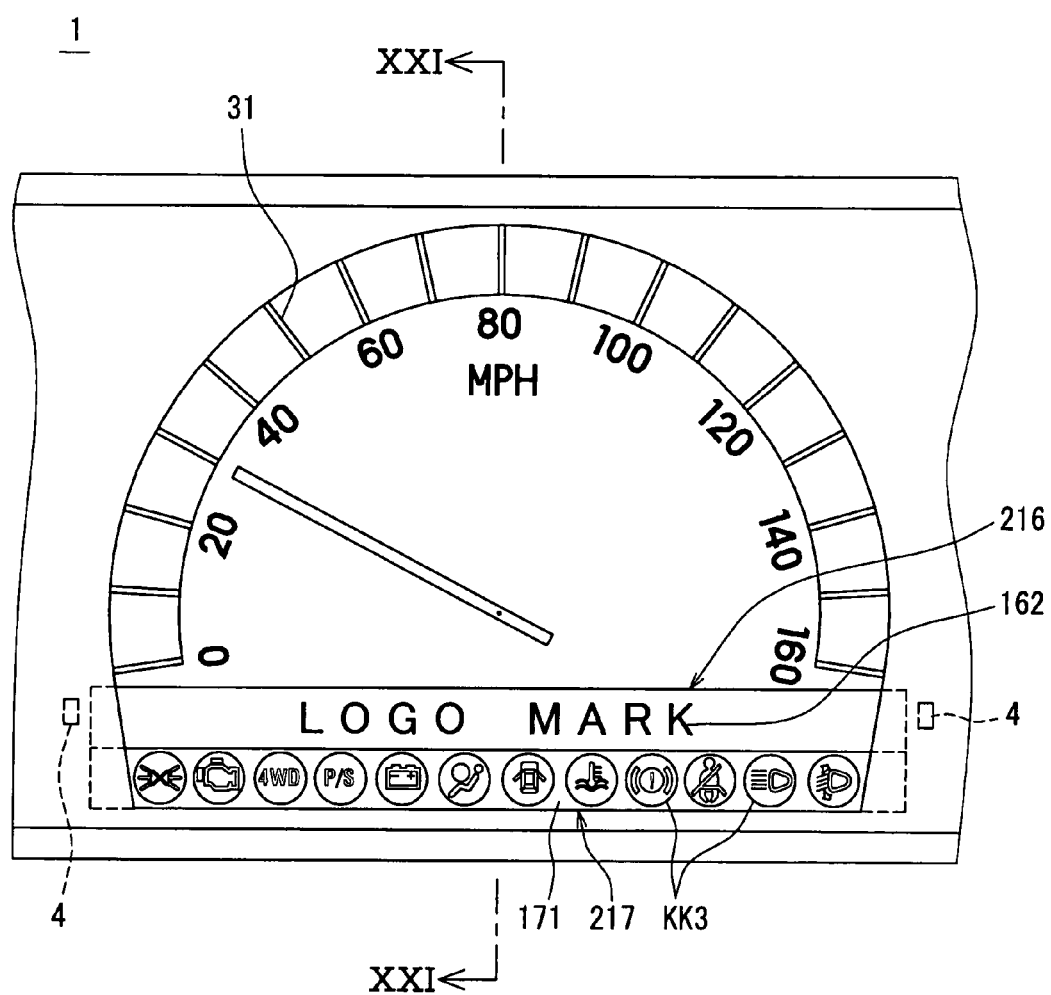
FIG. 20 is a partial front view of the combination meter 1 as the display device according to a eighth embodiment of the present invention.
Figure 21:
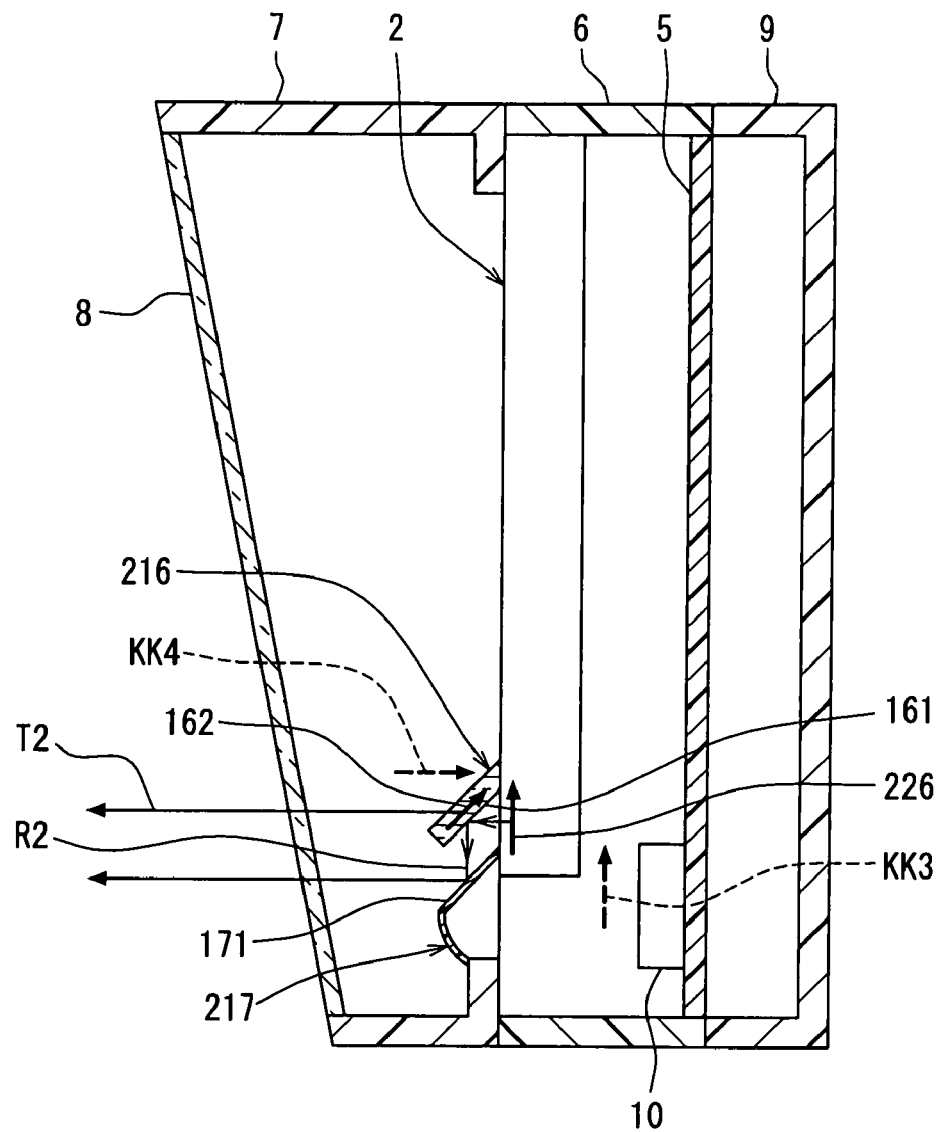
FIG. 21 is a cross-sectional view along a line XXI-XXI in FIG. 20.

A combination meter 1 according to an eighth embodiment of the present invention is shown in FIGS. 20 and 21. The meter 1 includes an ornament bar 216 and a mirror bar 217, instead of the ring 3 (i.e., the scale ring 214) and the mirror ring 204. The ornament bar provides an ornament member, and the mirror bar 217 provides the reflecting member.

Although the ring 3 has an arc shape along with the scale mark 31, which corresponds to the speedometer S, the ornament bar 216 has a linear shape, which does not relate to the shape of the speedometer S. Further, although the mirror ring 4 has an arc shape along with the scale mark 31, the mirror bar 217 has a linear shape.

The ornament bar 216 includes a logo mark 162 as the second display design. The logo mark 162 is, for example, a brand name of a vehicle on which the combination meter 1 is mounted. The mirror bar 17 includes a reflecting surface 171 as the second reflecting surface.

In the panel 2, an indicator/warning mark 226 as the first design is displayed. The indicator/warning mark 226 is viewed as the reflected virtual image KK3 on the reflecting surface 171 by reflecting with the reflecting surface 171. The indicator/warning mark 226 shows an indicator for notifying operation state of equipment in the vehicle and warning mark for warning anomaly of the vehicle. By displaying the indicator/warning mark 226, the information about the indicator and the warning mark is notified.

The indicator/warning mark 226 does not relate to the speedometer S, and provides a part of the image screen 21 on the panel 2. FIG. 20 shows a state that the indicator/warning mark 226 is displayed and the reflected virtual image KK3 is viewed on the reflecting surface 171.

In FIG. 20, the light of the diode 4 proceeds in the ornament bar 216. In FIG. 21, the light is reflected on the logo mark 162. The reflected light transmits through the ornament bar 216. The transmitted light T2 transmitted through the ornament bar 216 proceeds toward a passenger so as to be viewed as the real image of the logo mark 162.

In FIG. 21, the indication light of the indicator/warning mark 226 is reflected on the reflecting surface 216, so that the reflected virtual image KK4 is generated at a position plane symmetric to the indicator/warning mark 226 with the reflecting surface 161 as a symmetric plane. The reflected light from the reflecting surface 161 is reflected on the reflecting surface 171, so that the reflected virtual image KK3 is generated at a position plane symmetric to the reflected virtual image KK4 with the reflecting surface 171 as the symmetric plane.

Thus, the indicator/warning mark 226 is viewed as the reflected virtual image KK3 on the reflecting surface 171 by reflecting on the reflecting surface 171.

Here, the reflected virtual image KK3 of the indicator/warning mark 226 is viewed on the outside of a periphery of the image screen. Thus, a space for displaying arises on the ornament bar 216. The logo mark 162 is formed on the space for displaying. Thus, the combination of the reflected virtual image KK3 of the indicator/warning mark 226 and the logo mark 162 on the ornament bar 216 provides to improve the visual quality of the combination meter 1.

Here, the reflected virtual image KK3 of the indicator/warning mark 226 is viewed outside of the indicator/warning mark 226. Thus, the visual quality of the combination meter 1 is improved without increasing dimensions of the panel 2. Thus, the manufacturing cost of the meter 1 is limited.

Although the ornament bar 216 is made of light translucent material, the ornament bar 216 may be made of light non-translucent material. In this case, the logo mark 162 is formed on the upper side of the ornament bar 216 so that the above effect is obtained.

Note that in the combination meter 1 according to the above-described fifth embodiment of the present invention, the half mirror layer 232 is formed on the reflecting surface 231. However, a beam splitter layer of another specification, i.e., a layer in which the intensity ratio between the reflected light R and the transmitted light T is not 1:1, may be formed in place of the half mirror layer 232.

Further, in the combination meter 1 according to the above-described fifth to eighth embodiments of the present invention, the mirror ring 204 is formed of ABS resin and coated with the chrome plate layer 42, however, the mirror ring 204 is not limited to this combination of materials. It may be arranged such that a sheet member having a mirror surface, e.g., an aluminum-deposited resin sheet or mirror-finished metal thin plate is attached to the surface of the mirror ring 204 in place of the chrome plate layer 42. Further, the mirror ring 204 may be formed of metal material such as aluminum or stainless steel in place of ABS resin, and the reflecting surface 41 may be mirror-finished.

Further, in the combination meter 1 according to the above-described fifth to eighth embodiments of the present invention, the first display stylish part of which the reflected virtual images KK, KK1, KK3 is image-formed on the reflecting surface 41 of the mirror ring 204 and on the reflecting surface 171 of the mirror bar is the scale marks 31 and the indicator/warning mark 226. However, the first display stylish part is not limited to the scale marks, but any other display stylish parts such as a pointer may be used.

Further, in the combination meter 1 according to the above-described fifth to eighth embodiments of the present invention, the image formed on the image screen 21 of the liquid crystal panel 2 is the speedometer S, however, the image is not limited to the speedometer S. The image of the speedometer S may be replaced with another type of display image, e.g., a tachometer to indicate an engine speed of the vehicle or a fuel gauge to indicate the amount of remaining fuel in a fuel tank.

Further, in the combination meter 1 according to the above-described fifth to seventh embodiments of the present invention, the shape of the speedometer S is a round shape, and the plane shape of the transparent ring 3 and that of the mirror ring 204 are respectively a round shape (circular arc) in correspondence with the shape of the speedometer S. However, the shape is not limited to the round shape, but another shape may be employed. For example, these members may be formed in an oval shape.

Further, in the above-described fifth to eighth embodiments of the present invention, the display device is applied to the combination meter 1 mounted in a vehicle, however, the display device is not limited to a vehicle display device. The present invention may be applied to a display device incorporated in household appliances and the like.

The above disclosure has the following aspects.

According to a first aspect of the present disclosure, a display device includes: a display element for showing information as a screen image, wherein the display element has a display side and a backside, and wherein the display element includes a display surface, which is disposed on the display side; and an ornamental member disposed on the display surface of the display element. The ornamental member has a shape, which corresponds to a shape of the screen image. The ornamental member includes a light transparent element and a light nontransparent element, which are assembled with each other. The screen image includes a designed image, which is disposed on a position of the display surface corresponding to the light transparent element. The display element outputs a screen image light from the display surface. The screen image light corresponding to the designed image passes through the light transparent element so that the screen image light is outputted from the ornamental member to the display side.

In the above device, the display design on the display element is not directly viewed but viewed through the light transparent element of the ornamental member. Thus, the display design appears to protrude from the surface of the display element. Further, since the light nontransparent element is adjacent to the light transparent element, the light nontransparent element emphasizes existence of the light transparent element. The visual quality of the display element is improved such that three-dimensional appearance is emphasized and novel design is provided. Thus, the device has the novel design and the high visual quality without increasing the dimensions of the device.

Alternatively, the light transparent element may be made of translucent material, and the light nontransparent element may be made of non-translucent material. The ornamental member may further include a wall between the light transparent element and the light nontransparent element. The light transparent element contacts the light nontransparent element at the wall, and the wall extends from the backside to the display side. Further, the ornamental member may further include a diffusion reflection layer disposed on the light transparent element on the display side. Alternatively, the light nontransparent element may be made of non-translucent material, and the light transparent element is surrounded with the light nontransparent element. Alternatively, the ornamental member may further include a light reflection layer between the light transparent element and the light nontransparent element. The light transparent element contacts the light nontransparent element via the light reflection layer, and the light reflection layer has light reflection coefficient, which is higher than other elements of the ornamental member. Alternatively, the screen image may further include an indication graphic portion, and the designed image includes a high brightness portion. The indication graphic portion indicates change of the information by showing motion of the indication graphic portion. The high brightness portion has brightness, which is higher than other portions around the high brightness portion. The high brightness portion has a dot shape or a linear shape. The high brightness portion is disposed on an extension line of the indication graphic portion, and the high brightness portion is movable relative to the motion of the indication graphic portion. Further, the screen image in the display element may provide a meter with an indicator for indicating physical quantity on the basis of a position of the indicator, which is rotatable around a rotation center. The indication graphic portion provides the indicator. The ornamental member has a ring shape, which is a concentric circle around the rotation center of the indicator, and the ornamental member is spaced apart from a tip of the indicator. Furthermore, the display device may further include: a designed member having translucency and disposed on the display element; and a light source. The designed member is disposed adjacent to an inner circumference of the ornamental member. The light source emits light toward an inside of the designed member. The designed member includes a display design for the meter, and the display design reflects the light from the light source, the light passing through the inside of the designed member, so that the display design is displayed with luminescence. Further, the screen image in the display element may provide a route indication image for a navigation system. The indication graphic portion provides a route indication arrow. The ornamental member is disposed on an outside of the route indication image, and the ornamental member is spaced apart from a tip of the route indication arrow.

Alternatively, the display device may further include: a designed member having translucency and disposed on the display element; and a light source for emitting light toward an inside of the designed member. A part of the display element is visible through the designed member. The designed member includes a display design corresponding to the screen image of the display element. The designed member has a predetermined shape, which relates to a shape of the screen image, and the display design reflects the light from the light source, the light passing through the inside of the designed member, so that the display design is displayed with luminescence. Further, the screen image may further include an indication graphic portion and a high brightness portion. The indication graphic portion indicates change of the information by showing motion of the indication graphic portion. The high brightness portion has brightness, which is higher than other portions around the high brightness portion. The high brightness portion has a dot shape or a linear shape. The high brightness portion is disposed on an extension line of the indication graphic portion, and disposed on the designed member, and the high brightness portion is movable relative to the motion of the indication graphic portion. Furthermore, the screen image of the display element may provide a meter having an indicator for indicating physical quantity on the basis of a position of the indicator, which is rotatable around a rotation center. The indication graphic portion provides the indicator. The designed member has a ring shape, which is a concentric circle around the rotation center of the indicator, and the designed member is spaced apart from a tip of the indicator. Further, the screen image of the display element may provide a route indication image for a navigation system. The indication graphic portion provides a route indication arrow. The designed member is disposed on an outside of the route indication image, and the designed member is spaced apart from a tip of the route indication arrow. Further, the designed member may be disposed adjacent to the ornamental member. The light nontransparent element includes an inner light nontransparent element and an outer light nontransparent element, and the designed member, the inner light nontransparent element, the light transparent element and the outer light nontransparent element are aligned in this order.

According to a second aspect of the present disclosure, a display device includes: a display element for showing information as a screen image, wherein the display element has a display side and a backside, wherein the display element includes a display surface, which is disposed on the display side, and wherein the screen image includes a first display design; an ornamental member disposed on the display surface of the display element; a first reflection element disposed on the ornamental member, wherein the first reflection element reflects a screen image light toward a direction in parallel to the display surface, the screen image light corresponding to the first display design of the screen image and outputted from the display element; and a second reflection member including a second reflection surface. The second reflection surface reflects a reflected screen image light from the first reflection element toward the display side. The second reflection surface contacts an outer periphery of the screen image, and the first display design provides a reflected virtual image, which is imaged on the second reflection surface by reflecting the reflected screen image light with the second reflection surface.

In the above device, since the ornamental member and the second reflection member are arranged on the display side from the surface of the display element, the visual quality of the display element is improved such that three-dimensional appearance is emphasized. Further, the reflected virtual image of the first display design is viewed on the outside of the outer periphery of the screen image. Thus, without replacing the display element to a larger one, the display region of the screen image appears to be larger. Thus, the device has the novel design and the high visual quality without increasing the dimensions of the device.

Alternatively, the ornamental member may have a shape corresponding to a shape of the screen image. The screen image in the display element provides a meter with an indicator for indicating physical quantity on the basis of a position of the indicator, which is rotatable around a rotation center, and the first display design is a scale of the meter. Further, the scale may be disposed on a region from a position of the indicator toward a counter clockwise direction. Alternatively, the ornamental member may be made of translucent material. The first reflection element includes a beam splitter layer for dividing the screen image light into a transmitted light and a reflected light. The first display design further provides a real image. The real image is formed by the transmitted light, which is transmitted through the first reflection element and the ornamental member, and the reflected virtual image is formed by the reflected light. Alternatively, the ornamental member may further include a second display design.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A display device comprising:
   a display element for showing information as a screen image, wherein the display element has a display side and a backside, and wherein the display element includes a display surface, which is disposed on the display side; and
   an ornamental member disposed on the display surface of the display element, wherein
   the ornamental member has a shape, which surrounds a shape of the screen image,
   the ornamental member includes a light transparent element and a light nontransparent element, which are assembled with each other,
   the screen image includes a designed image, which is disposed on a position of the display surface corresponding to the light transparent element,
   the display element outputs a screen image light from the display surface,
   the screen image light corresponding to the designed image passes through the light transparent element so that the screen image light is outputted from the ornamental member to the display side, and
   the light transparent element is directly adjacent to the light nontransparent element so that the ornamental member provides a continuous frame for the designed image.

2. The display device according to claim 1, wherein
   the light transparent element is made of translucent material,
   the light nontransparent element is made of non-translucent material,
   the ornamental member further includes a wall between the light transparent element and the light nontransparent element,
   the light transparent element contacts the light nontransparent element at the wall, and
   the wall extends from the backside to the display side.

3. The display device according to claim 2, wherein
   the ornamental member further includes a diffusion reflection layer disposed on the light transparent element on the display side.

4. The display device according to claim 1, wherein
   the light nontransparent element is made of non-translucent material, and
   the light transparent element is surrounded with the light nontransparent element.

5. The display device according to claim 1, wherein
   the ornamental member further includes a light reflection layer between the light transparent element and the light nontransparent element,
   the light transparent element contacts the light nontransparent element via the light reflection layer, and
   the light reflection layer has light reflection coefficient, which is higher than other elements of the ornamental member.

6. The display device according to claim 1, wherein
   the screen image further includes an indication graphic portion, and the designed image includes a high brightness portion,
   the indication graphic portion indicates change of the information by showing motion of the indication graphic portion,
   the high brightness portion is brighter than other portions around the high brightness portion,
   the high brightness portion has a dot shape or a linear shape,
   the high brightness portion is disposed on an extension line of the indication graphic portion, and
   the high brightness portion is movable relative to the motion of the indication graphic portion.

7. The display device according to claim 6, wherein
   the screen image of the display element includes a meter having an indicator for indicating physical quantity on the basis of a position of the indicator, which is rotatable around a rotation center,
   the indicator of the meter included in the screen image constitutes the indication graphic portion;
   the ornamental member has a ring shape, which is a concentric circle around the rotation center of the indicator, and
   the ornamental member is spaced apart from a tip of the indicator.

8. The display device according to claim 7, further comprising:
   a designed member having translucency and disposed on the display element; and
   a light source, wherein
   the designed member is disposed adjacent to an inner circumference of the ornamental member,
   the light source emits light toward an inside of the designed member,
   the designed member includes a display design for the meter, and the display design reflects the light from the light source, the light passing through the inside of the designed member, so that the display design is displayed with luminescence.

9. The display device according to claim 6, wherein
the screen image in the display element provides a route indication image for a navigation system,
the indication graphic portion provides a route indication arrow,
the ornamental member is disposed on an outside of the route indication image, and
the ornamental member is spaced apart from a tip of the route indication arrow.

10. The display device according to claim 1, wherein
the display element is a liquid crystal display element.

11. The display device according to claim 10, wherein
the light transparent element is sandwiched by the light nontransparent element,
the light transparent element contacts the light nontransparent element,
the light transparent element and the light nontransparent element protrude from the display surface of the display element, and
a height of the light transparent element measured from the display surface is greater than a height of the light nontransparent element measured from the display surface.

12. The display device according to claim 1, further comprising:
a designed member having translucency and disposed on the display element; and
a light source for emitting light toward an inside of the designed member, wherein
a part of the display element is visible through the designed member,
the designed member includes a display design corresponding to the screen image of the display element,
the designed member has a predetermined shape, which relates to a shape of the screen image, and
the display design reflects the light from the light source, the light passing through the inside of the designed member, so that the display design is displayed with luminescence.

13. The display device according to claim 12, wherein
the screen image further includes an indication graphic portion and a high brightness portion,
the indication graphic portion indicates change of the information by showing motion of the indication graphic portion,
the high brightness portion is brighter than other portions around the high brightness portion,
the high brightness portion has a dot shape or a linear shape,
the high brightness portion is disposed on an extension line of the indication graphic portion, and disposed on the designed member, and
the high brightness portion is movable relative to the motion of the indication graphic portion.

14. The display device according to claim 13, wherein
the screen image of the display element includes a meter having an indicator for indicating physical quantity on the basis of a position of the indicator, which is rotatable around a rotation center,
the indicator of the meter included in the screen image constitutes the indication graphic portion;
the designed member has a ring shape, which is a concentric circle around the rotation center of the indicator, and the designed member is spaced apart from a tip of the indicator.

15. The display device according to claim 13, wherein
the screen image of the display element provides a route indication image for a navigation system,
the indication graphic portion provides a route indication arrow,
the designed member is disposed on an outside of the route indication image, and
the designed member is spaced apart from a tip of the route indication arrow.

16. The display device according to claim 12, wherein
the designed member is disposed adjacent to the ornamental member,
the light nontransparent element includes an inner light nontransparent element and an outer light nontransparent element, and
the designed member, the inner light nontransparent element, the light transparent element and the outer light nontransparent element are aligned in this order.

17. The display device according to claim 12, wherein
the display element is a liquid crystal display element.

18. A display device comprising:
a display element for showing information as a screen image, wherein the display element has a display side and a backside, wherein the display element includes a display surface, which is disposed on the display side, and wherein the screen image includes a first display design;
an ornamental member disposed on the display surface of the display element;
a first reflection element disposed on the ornamental member, wherein the first reflection element reflects a screen image light toward a direction in parallel to the display surface, the screen image light corresponding to the first display design of the screen image and outputted from the display element; and
a second reflection member including a second reflection surface, wherein
the second reflection surface reflects a reflected screen image light from the first reflection element toward the display side,
the second reflection surface contacts an outer periphery of the screen image,
the first display design provides a reflected virtual image, which is imaged on the second reflection surface by reflecting the reflected screen image light with the second reflection surface,
the second reflection element is spaced apart from the first reflection element by a predetermined distance, and
the second reflection element is disposed on an outer periphery of the first reflection element in such a manner that the first reflection element faces the second reflection element.

19. The display device according to claim 18, wherein
the ornamental member has a shape corresponding to a shape of the screen image,
the screen image in the display element provides a meter with an indicator for indicating physical quantity on the basis of a position of the indicator, which is rotatable around a rotation center, and
the first display design is a scale of the meter.

20. The display device according to claim 19, wherein
the scale is disposed on a region from a position of the indicator toward a counter clockwise direction.

21. The display device according to claim 18, wherein
the ornamental member is made of translucent material,
the first reflection element includes a beam splitter layer for dividing the screen image light into a transmitted light and a reflected light,
the first display design further provides a real image,
the real image is formed by the transmitted light, which is transmitted through the first reflection element and the ornamental member, and
the reflected virtual image is formed by the reflected light.

22. The display device according to claim 18, wherein
the ornamental member further includes a second display design.

23. The display device according to claim 18, wherein
the display element is a liquid crystal display element.

24. The display device according to claim 18, wherein
the first and second reflection elements surround a shape of the first display design of the screen image on the display element, and
the first and second reflection elements provide a continuous frame for the first display design.

\* \* \* \* \*